US010397423B2

(12) United States Patent
Hirose

(10) Patent No.: US 10,397,423 B2
(45) Date of Patent: Aug. 27, 2019

(54) PRINTING APPARATUS, CONTROL METHOD FOR THE SAME, AND STORAGE MEDIUM TO TRANSFER SPECIFIC DATA UPON OCCURRENCE OF INTERRUPTION

(71) Applicant: CANON KABUSHIKI KAISHA, Tokyo (JP)

(72) Inventor: Fumiaki Hirose, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/884,055

(22) Filed: Jan. 30, 2018

(65) Prior Publication Data
US 2018/0152577 A1 May 31, 2018

Related U.S. Application Data

(63) Continuation of application No. 15/229,660, filed on Aug. 5, 2016, now Pat. No. 9,917,966.

(30) Foreign Application Priority Data

Aug. 7, 2015 (JP) ................... 2015-157615

(51) Int. Cl.
H04N 1/00 (2006.01)
H04N 1/12 (2006.01)
H04N 1/21 (2006.01)
(52) U.S. Cl.
CPC ..... *H04N 1/00795* (2013.01); *H04N 1/00244* (2013.01); *H04N 1/00408* (2013.01); *H04N 1/00602* (2013.01); *H04N 1/121* (2013.01); *H04N 1/21* (2013.01); *H04N 2201/0094* (2013.01)

(58) Field of Classification Search
None
See application file for complete search history.

(56) References Cited

U.S. PATENT DOCUMENTS

| 5,889,595 A * | 3/1999 | Kim .......................... B41J 2/36 |
| | | 347/14 |
| 6,061,148 A | 5/2000 | Ishikawa |
| 2010/0123919 A1 | 5/2010 | Akimoto |
| 2013/0038892 A1 * | 2/2013 | Morita ............... G06K 15/1822 |
| | | 358/1.14 |

FOREIGN PATENT DOCUMENTS

| CN | 101132532 A | 2/2008 |
| CN | 101795340 A | 8/2010 |

(Continued)

*Primary Examiner* — Thomas D Lee
(74) *Attorney, Agent, or Firm* — Canon U.S.A., Inc. IP Division

(57) ABSTRACT

Upon occurrence of an interruption factor before image data for one page of a target document has been stored in a storage device, a printing apparatus performs control to store specific data in a storage area of the storage device in which the remaining image data of the target document is to be stored. In a case where an interruption factor occurs before image data for one page of the target document has been stored in the storage device, the printing apparatus performs printing based on the image data of the target document and the specific data stored in the storage device.

12 Claims, 19 Drawing Sheets

(56) References Cited

FOREIGN PATENT DOCUMENTS

| | | |
|---|---|---|
| JP | H08-009118 A | 1/1996 |
| JP | 9-261387 A | 10/1997 |
| JP | 2000-259487 A | 9/2000 |
| JP | 2002-314763 A | 10/2002 |
| JP | 2010-041099 A | 2/2010 |
| JP | 2013-081048 A | 5/2013 |
| JP | 2013-162343 A | 8/2013 |

* cited by examiner

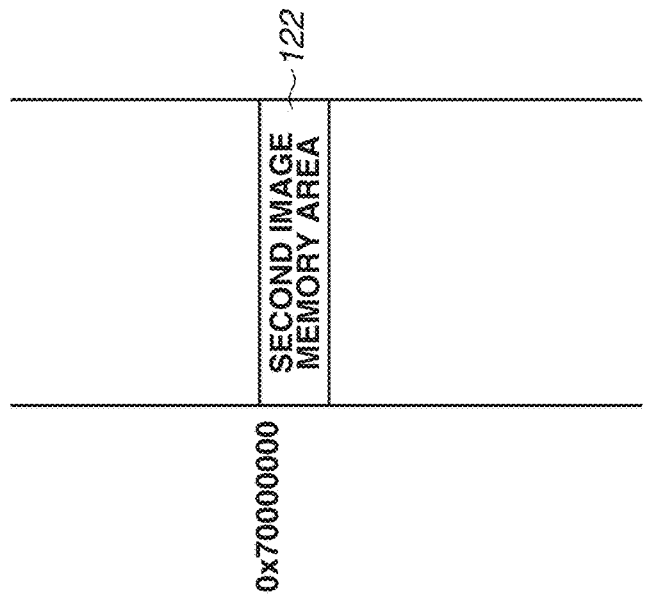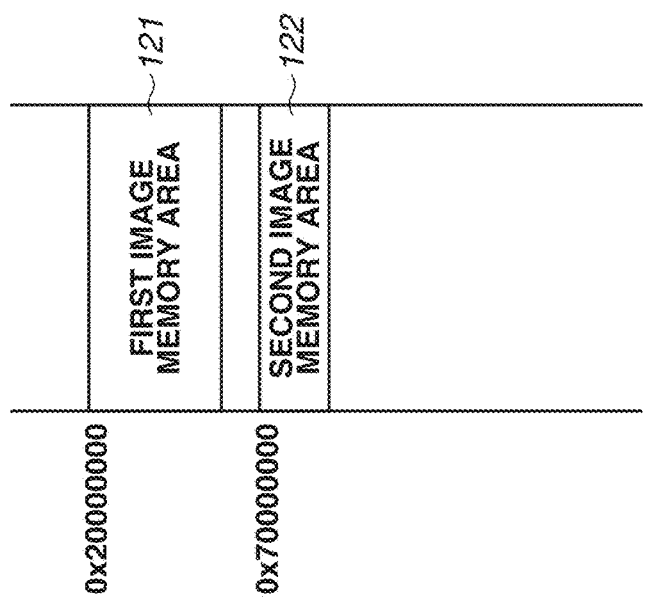

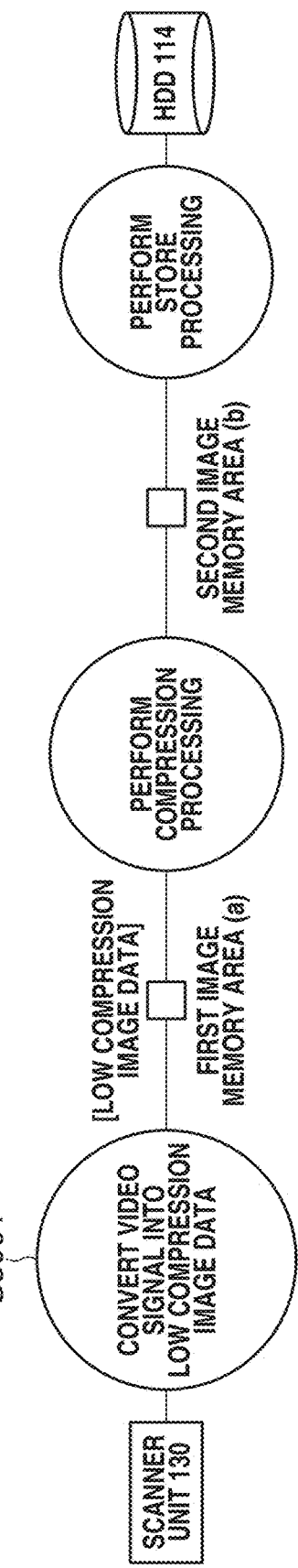
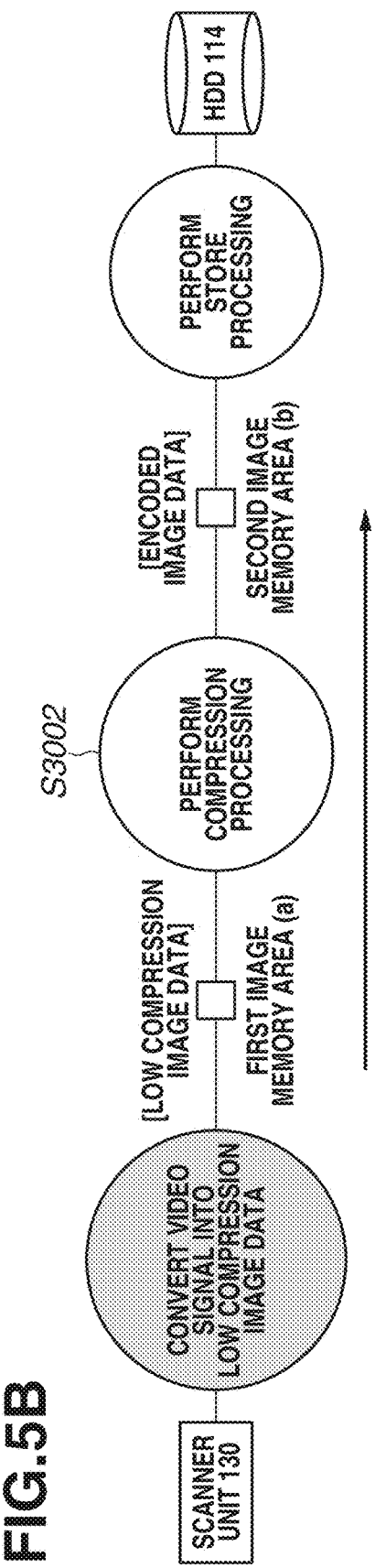

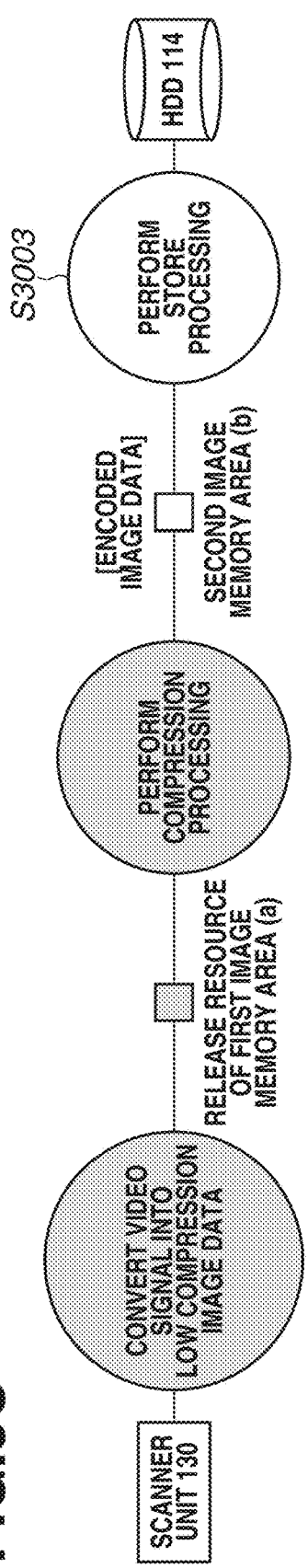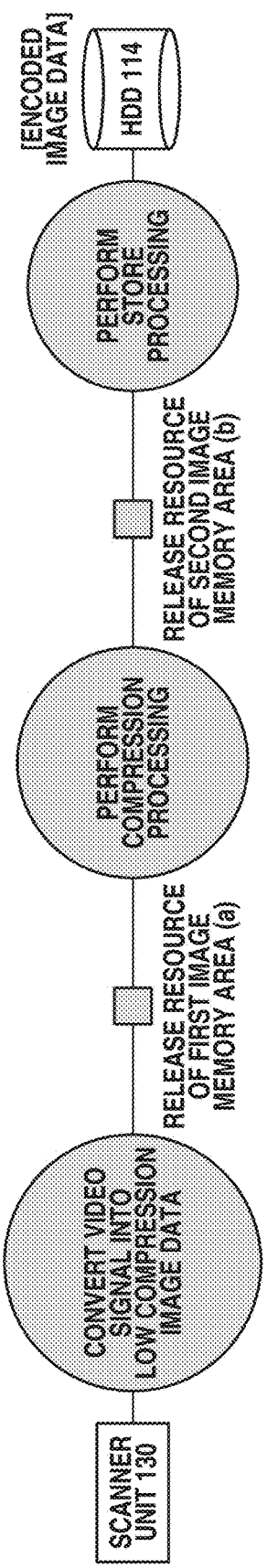

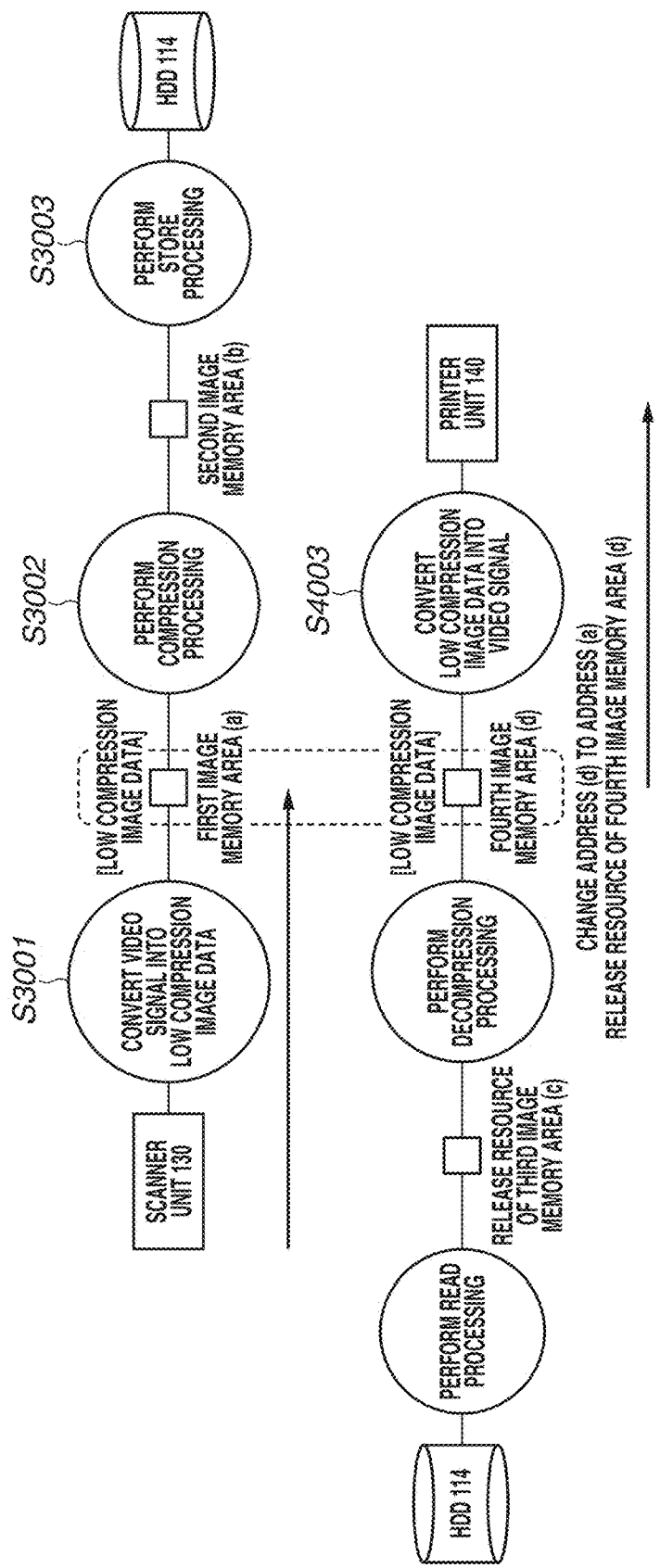

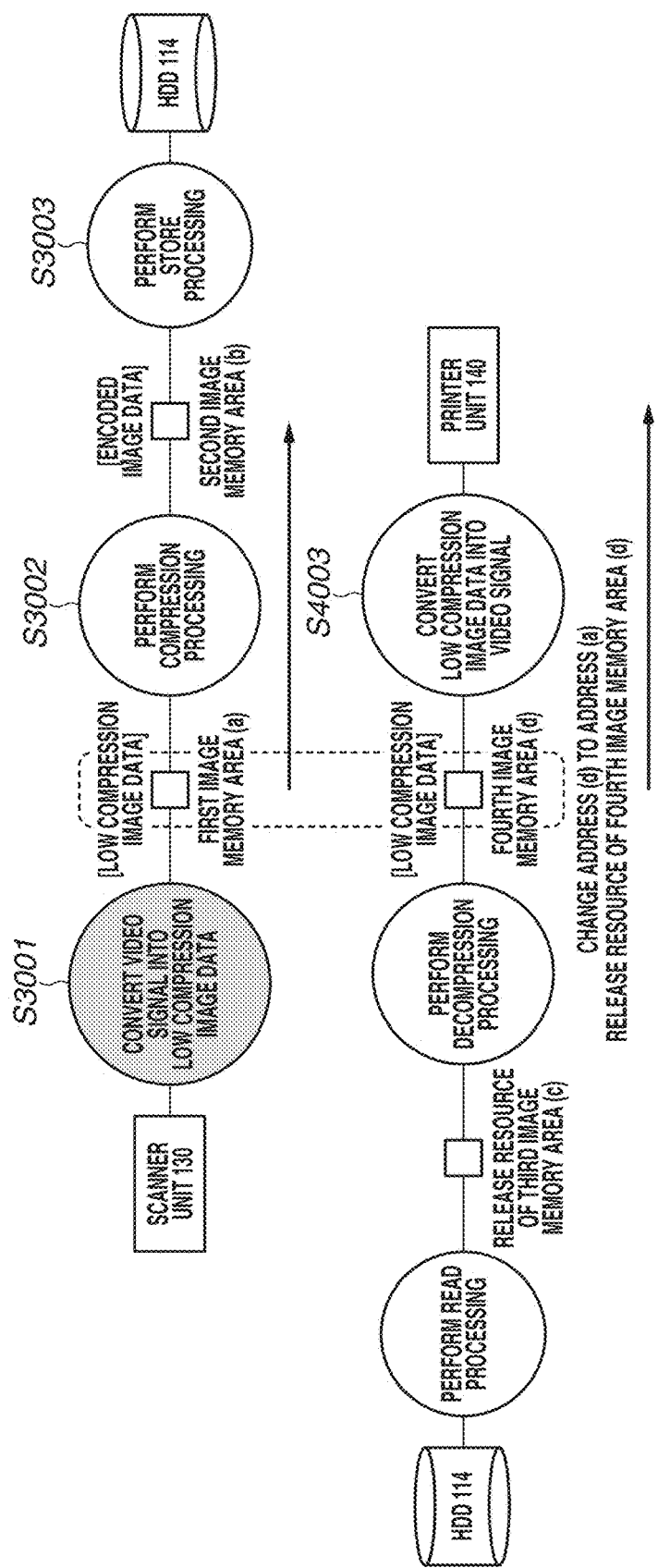

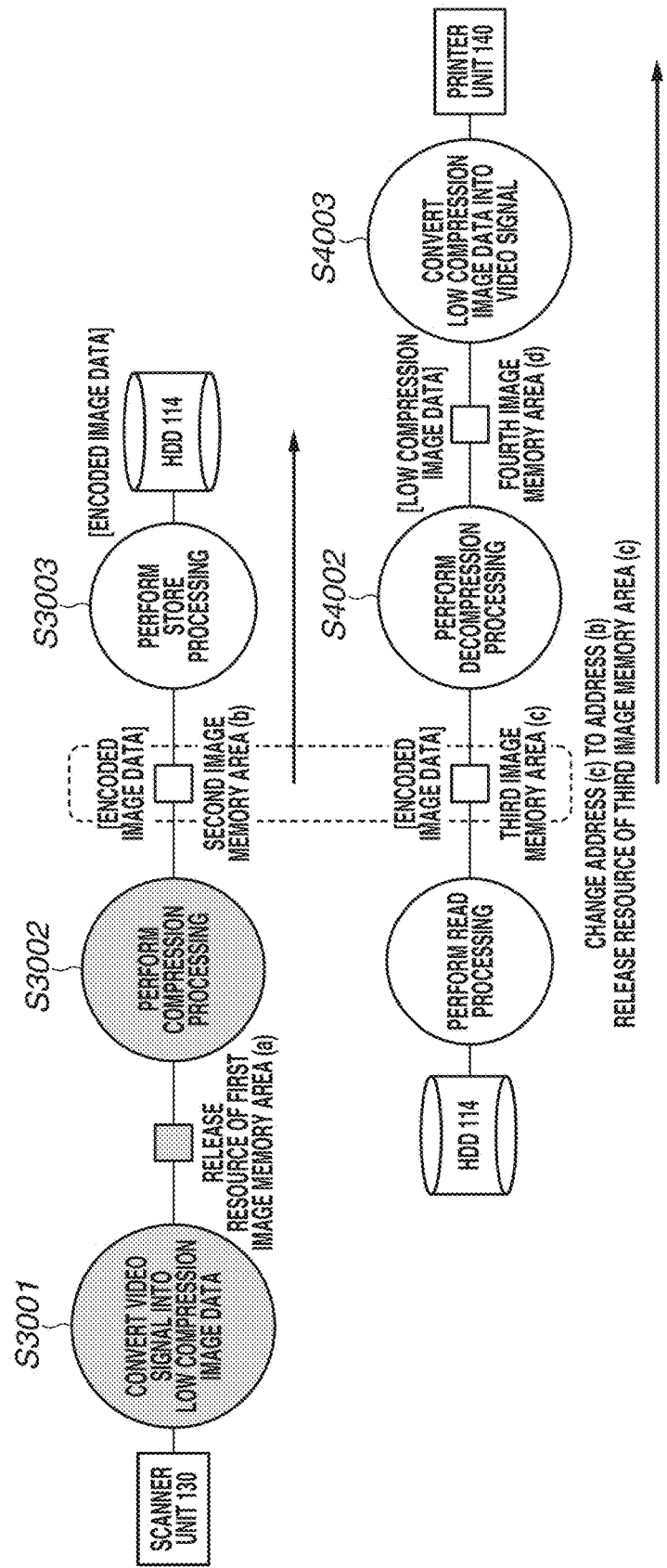

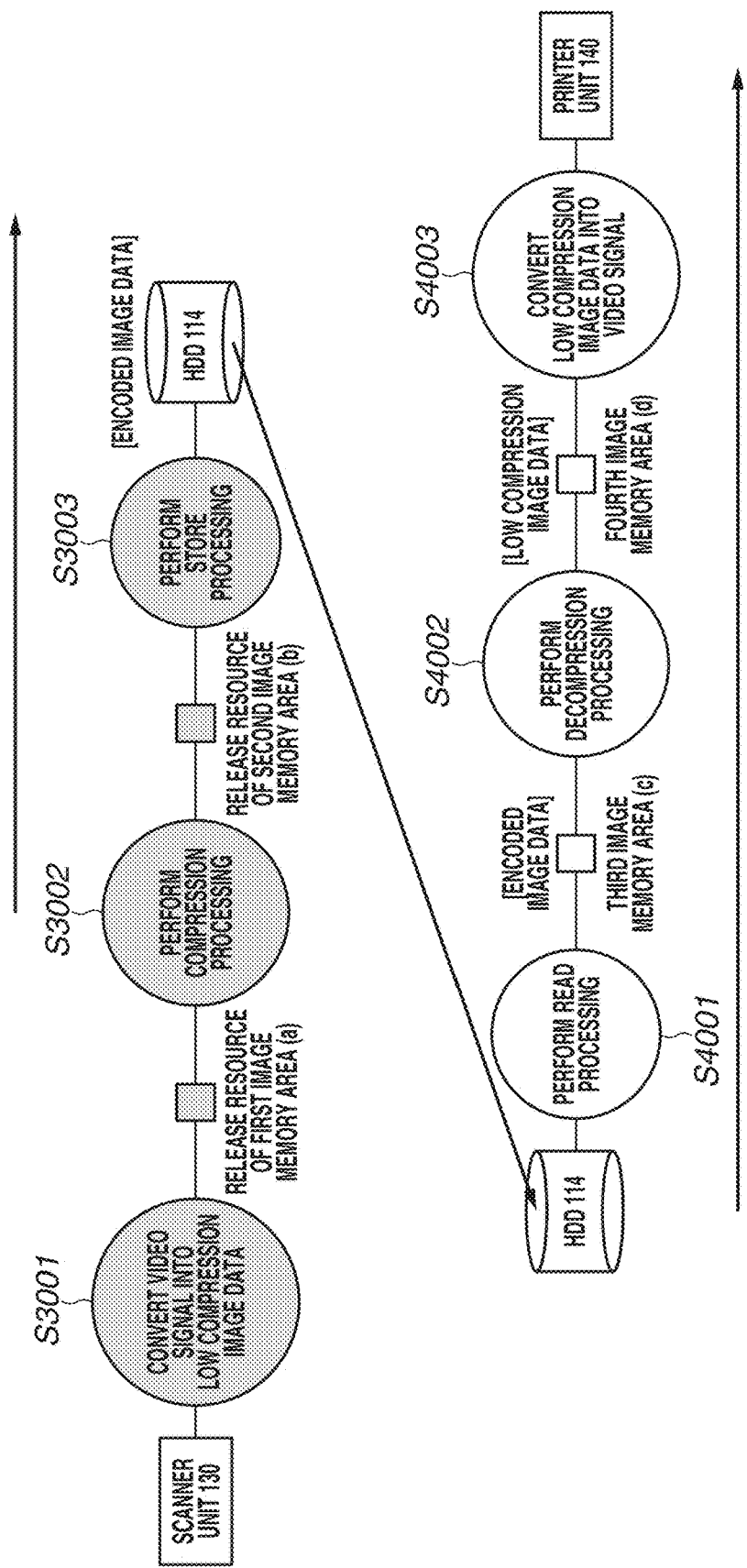

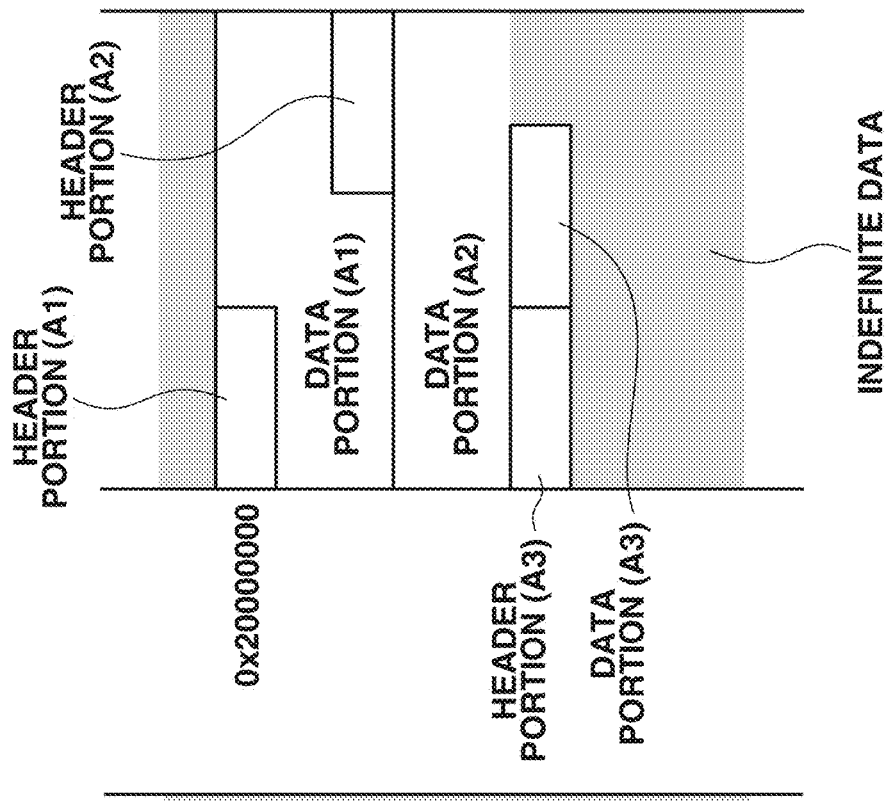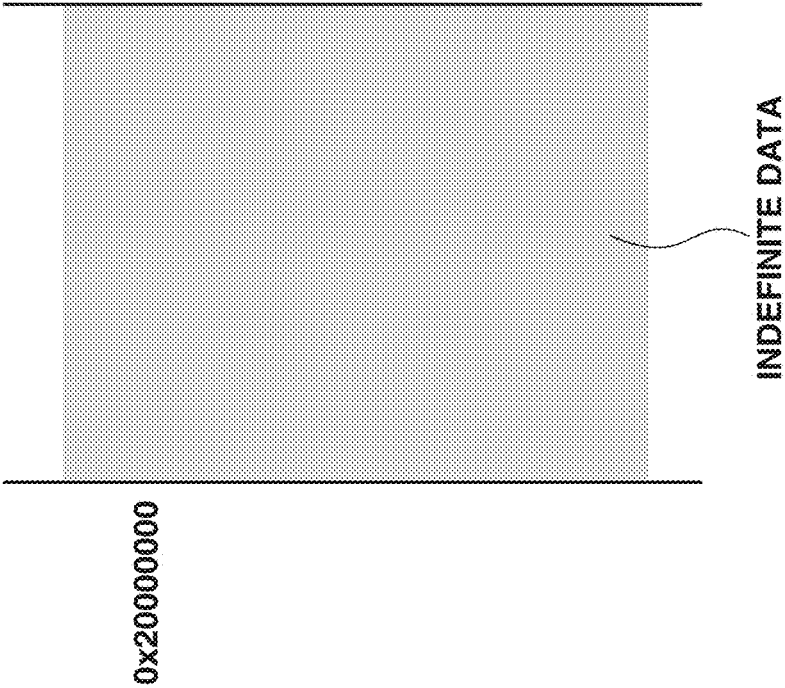

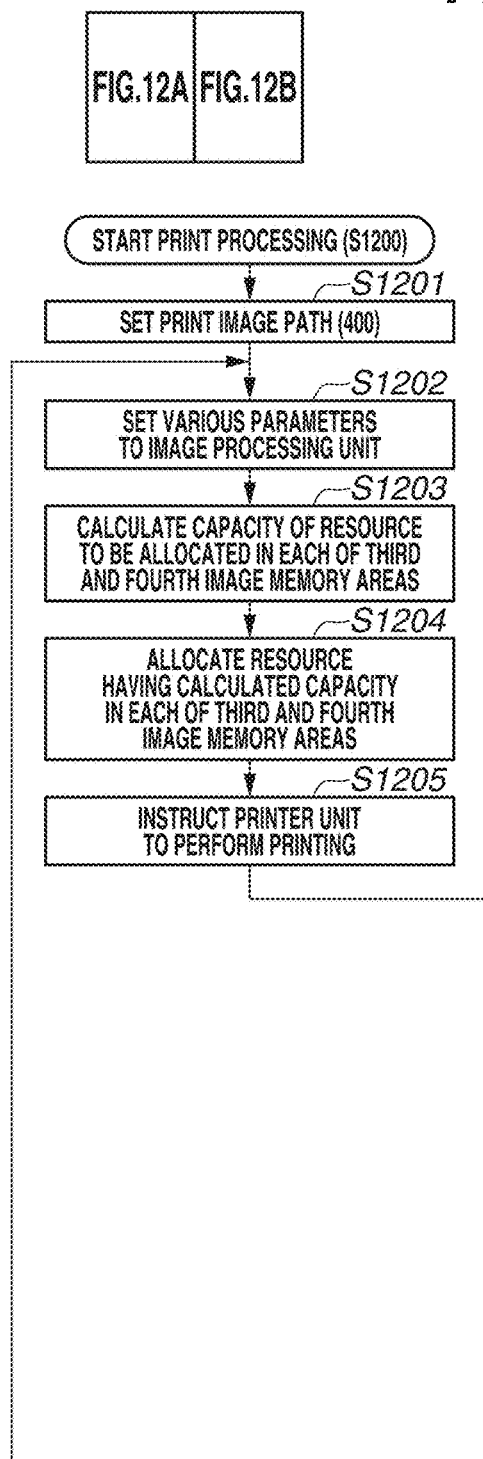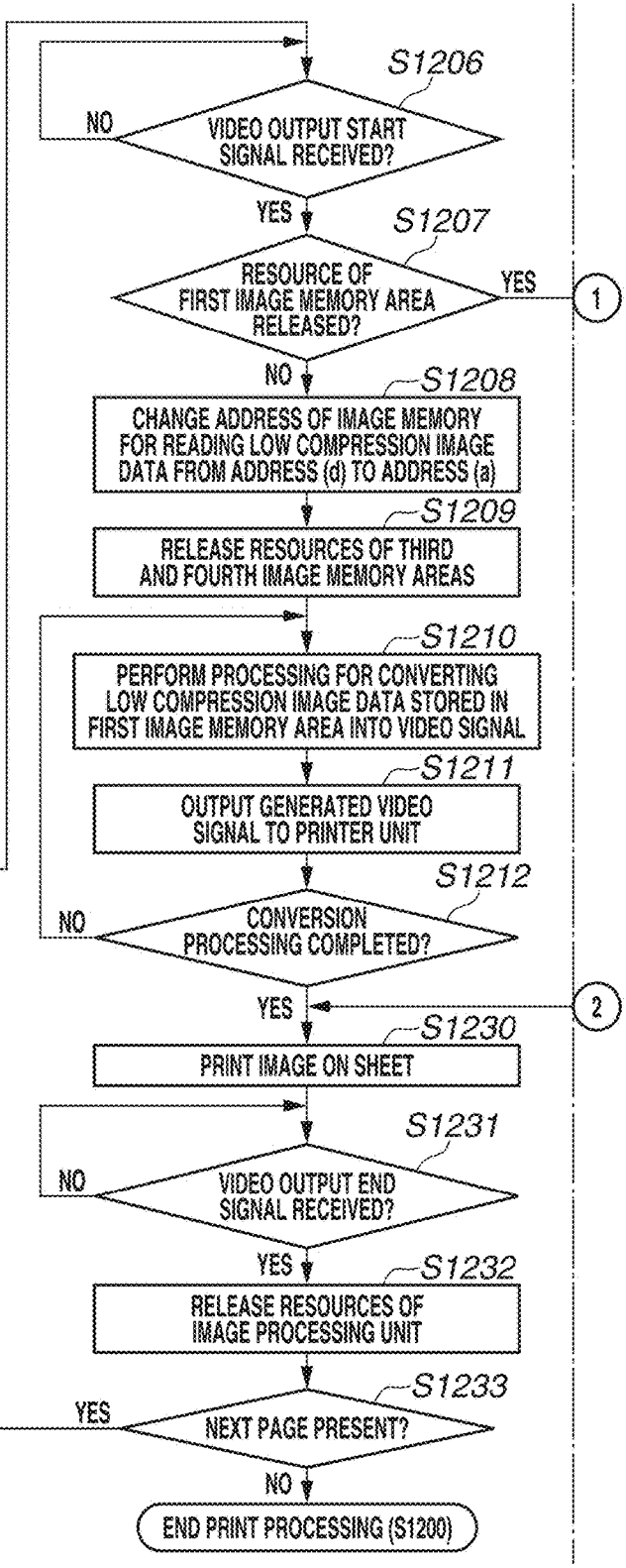

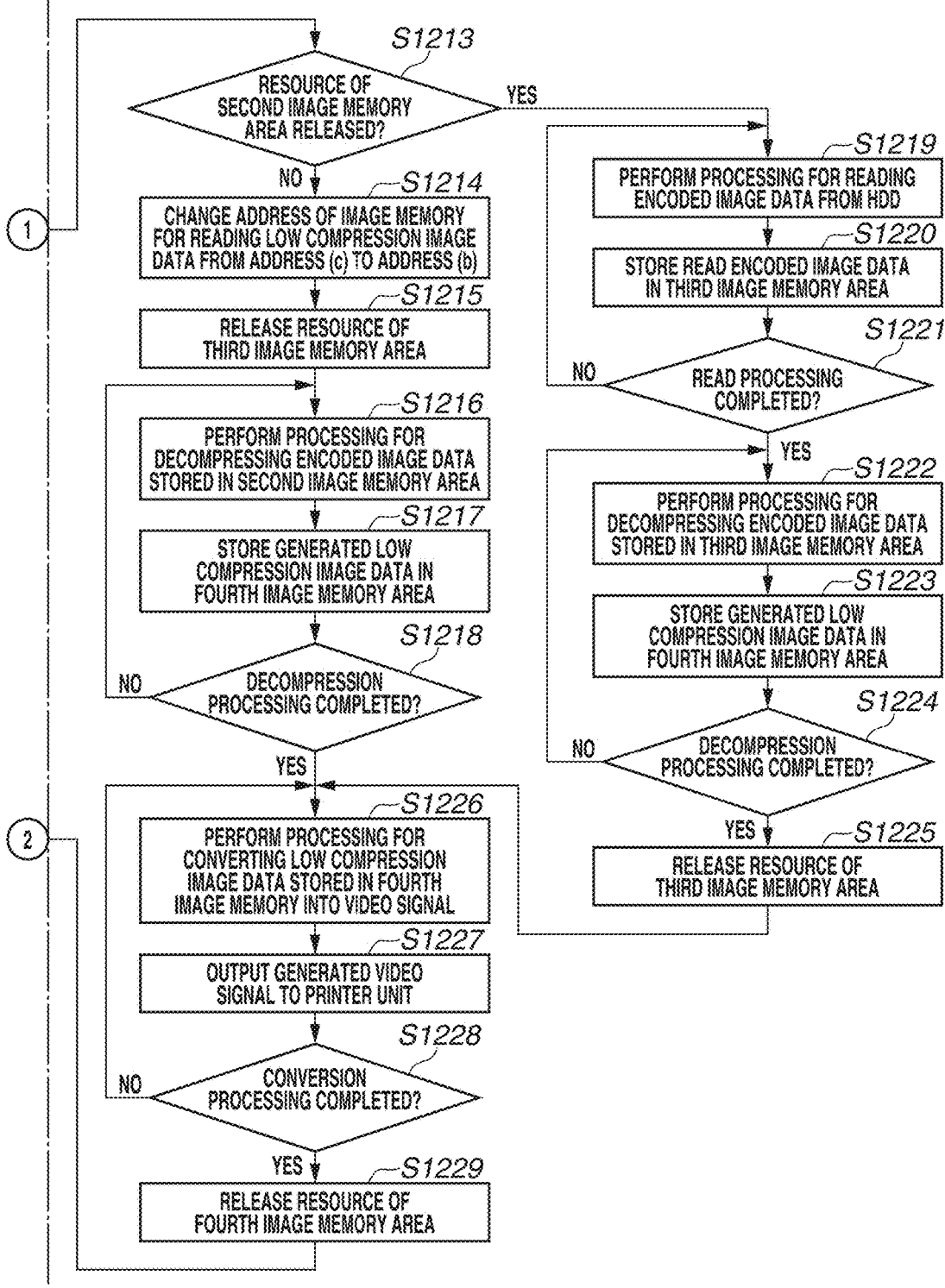

FIG.13A

| Address | Area |
|---|---|
| 0x20000000 | FIRST IMAGE MEMORY AREA (121) |
| 0x70000000 | SECOND IMAGE MEMORY AREA (122) |
| 0x80000000 | THIRD IMAGE MEMORY AREA (123) |
| 0x90000000 | FOURTH IMAGE MEMORY AREA (124) |

FIG.13B

| Address | Area |
|---|---|
| 0x20000000 | FIRST IMAGE MEMORY AREA → FOURTH IMAGE MEMORY AREA (121) |
| 0x70000000 | SECOND IMAGE MEMORY AREA (122) |
| 0x80000000 | THIRD IMAGE MEMORY AREA (123) |
| 0x90000000 | FOURTH IMAGE MEMORY AREA (124) |

FIG.13C

| Address | Area |
|---|---|
| 0x20000000 | FIRST IMAGE MEMORY AREA FOURTH IMAGE MEMORY AREA (121) |
| 0x70000000 | SECOND IMAGE MEMORY AREA (122) |

PRINTING APPARATUS, CONTROL METHOD FOR THE SAME, AND STORAGE MEDIUM TO TRANSFER SPECIFIC DATA UPON OCCURRENCE OF INTERRUPTION

CROSS-REFERENCE TO RELATED APPLICATION

This application is a Continuation of U.S. application Ser. No. 15/229,660, filed Aug. 5, 2016, which claims priority from Japanese Patent Application No. 2015-157615, filed Aug. 7, 2015, which are hereby incorporated by reference herein in their entireties.

BACKGROUND OF THE INVENTION

Field of the Invention

One disclosed aspect of the embodiments relates to a printing apparatus configured to perform printing, a control method for the printing apparatus, and a storage medium.

More specifically, a disclosed aspect of the embodiments relates to a printing apparatus configured to perform printing and a control method for the printing apparatus.

Description of the Related Art

There are two methods for reading a document such as an optical system moving method and a feeding-reading method. With the optical system moving method, while an optical system is being moved, it reads a document placed at a fixed document position on a platen glass. One technique is called First Copy Out Time (FCOT). FCOT indicates how much time it takes a printing apparatus to read the first page of a document and output that page onto a sheet based on generated image data. With the feeding-reading method, while a document placed on a document tray is being conveyed by an automatic document feeder (ADF), an optical system fixed at a position reads the document.

In a digital copy machine discussed in Japanese Patent Application Laid-Open No. 9-261387, a scanner sequentially reads an image of each document fed by an Automatic Document Feeder (ADF) and stores generated image data in an image memory (this operation is referred to as an image read operation). Upon completion of the image read operation, this digital copy machine outputs the image data stored in the image memory to a printer to form an image on a sheet (this operation is referred to as an image forming operation). When the first document is fed by the ADF, this digital copy machine stores image data generated by reading an image of the document with the scanner in the image memory and then outputs the image data without compression to the printer to form an image on a sheet. For example, if a document jam occurs in the ADF during execution of the image read operation on the third document by the scanner and the image forming operation on the image data of the first document by the printer, the digital copy machine stops only the image read operation. Even after the image read operation stops, the digital copy machine continues the image forming operation on the image data of the document already stored in the image memory.

With a printing apparatus in which the speed for storing image data in an image memory through document reading is higher than the speed for reading image data from the image memory for printing, it is desirable to perform the image read operation and the image forming operation in parallel from the viewpoint of shortening processing time.

Accordingly, the printing apparatus reads image data of a document to be read (hereinafter referred to as a target document) from the storage device before image data for one page of the target document has been stored in the storage device and then performs printing based on the read image data (hereinafter this mode is referred to as a copy parallel processing mode). While this mode improves the speed of processing, there may be some situations that produce undesirable results. One such situation is the generation of indefinite data caused by an interruption as will be explained in the following.

If an interruption factor occurs before image data for one page of the target document has been stored in the storage device, the remaining image data of the target document is not stored in the storage device. For example, if an interruption factor such as a document jam occurs during conveyance of the target document, the conveyance of the document stops and therefore the remaining image of the target document is not read. In this case, since a video signal of the remaining image of the document is not input to the controller unit of the printing apparatus, the remaining image data of the document is not stored in the storage device. Therefore, indefinite data stored in the storage area of the storage device in which the remaining image data of the document is to be stored is not overwritten by the remaining image data of the document, i.e., indefinite data remains in the storage area.

For this reason, if an interruption factor occurs before image data for one page of the target document has been stored in the storage device, the printing apparatus reads indefinite data remaining in the storage area of the storage device in which the remaining image data of the target document is to be stored. Some examples of indefinite data include random data stored in the image memory when data stored in the image memory is cleared, and data stored in the image memory during execution of another job (e.g., a print job received from an external apparatus via a network, a FAX reception job, etc.).

Then, the printing apparatus performs printing based on the read indefinite data. If this indefinite data is random data unexpected by a user, the printing apparatus will perform printing based on the random data. In such a case, when the user sees a printed sheet (printed product), the user may get confused at the unexpected data. On the other hand, if this indefinite data is data of a different user's job that cannot essentially be accessed by the user, the printing apparatus will perform printing based on the data of the different user's job. In such a case, when the user sees a printed sheet (printed product), the user will get to know the data of the different user's job that cannot essentially be accessed.

SUMMARY OF THE INVENTION

According to an aspect of the disclosure, a printing apparatus includes a reader configured to read a document, a storage device configured to store image data of the document read by the reader, a printing unit or device configured to read the image data of the document from the storage device before image data for one page of the document has been stored in the storage device and to perform printing based on the read image data, and a control unit or controller configured to, according to occurrence of an interruption factor before image data for one page of the document has been stored in the storage device, perform control to store specific data in a storage area of the storage device in which remaining image data of the document is to be stored, wherein, in a case where an interruption factor occurs before image data for one page of the document has been stored in the storage device, the printing device performs printing based on the image data of the document stored in the storage device and the specific data stored in the storage device.

Further features of the disclosure will become apparent from the following description of exemplary embodiments with reference to the attached drawings.

BRIEF DESCRIPTION OF THE DRAWINGS

FIGS. 4A and 4B are schematic diagrams illustrating memory control according to the first exemplary embodiment.

FIGS. 5A, 5B, 5C, and 5D are schematic diagrams illustrating examples of control according to the first exemplary embodiment.

FIGS. 6A, 6B, 6C, and 6D are schematic diagrams illustrating examples of control according to the first exemplary embodiment.

FIGS. 8A and 8B are schematic diagrams illustrating data of a memory according to the first exemplary embodiment.

FIG. 12 (consisting of FIGS. 12A and 12B) is a flowchart illustrating an example of control according to the first exemplary embodiment.

FIGS. 13A, 13B, and 13C are schematic diagrams illustrating memory control according to the first exemplary embodiment.

DESCRIPTION OF THE EMBODIMENTS

Figure 1:
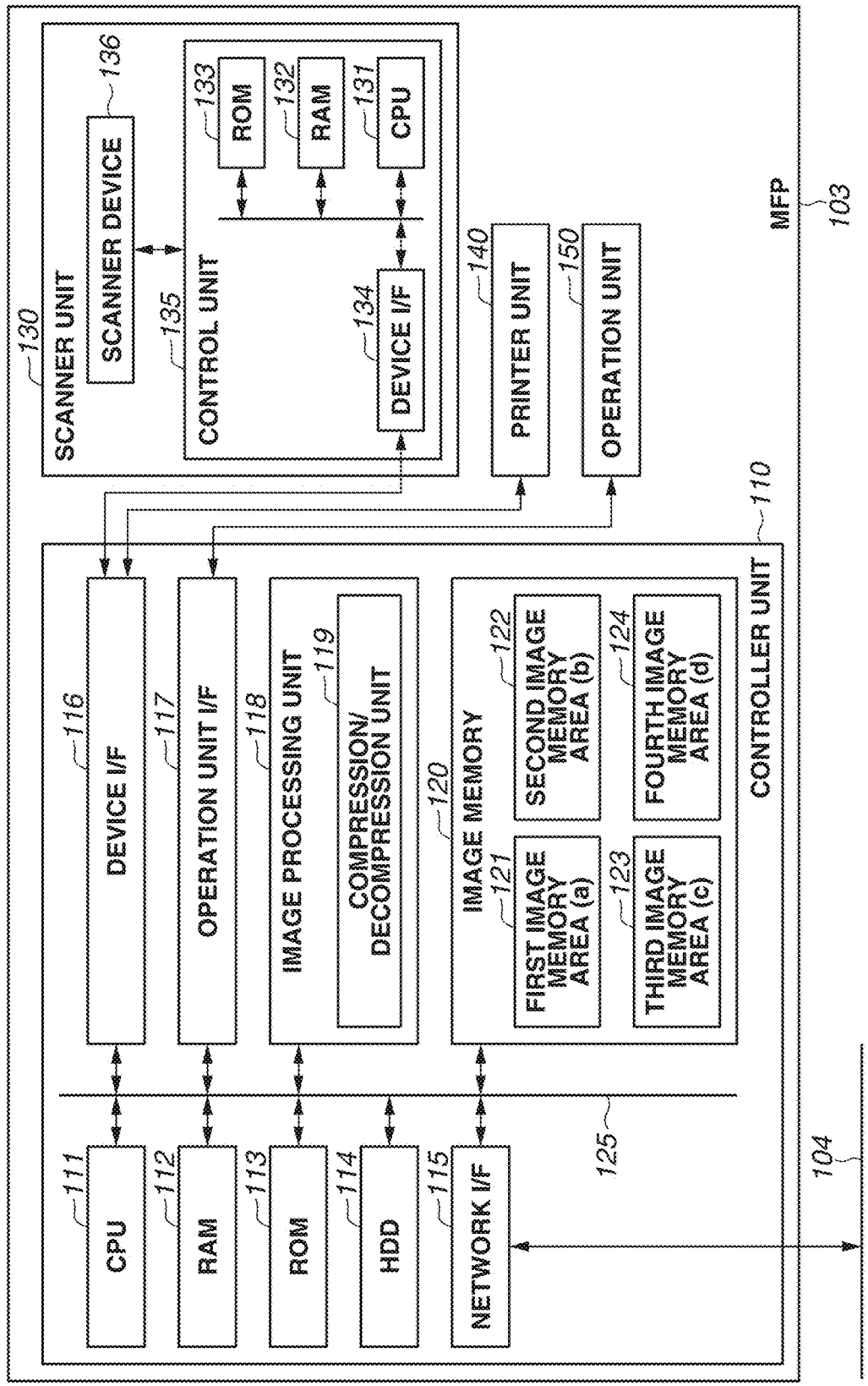
FIG. 1 is a block diagram illustrating a configuration of a multifunctional peripheral (MFP) according to an exemplary embodiment.

Exemplary embodiments of the disclosure will be described in detail below with reference to the accompanying drawings. The following exemplary embodiments are not intended to limit the ambit of the disclosure according to the appended claims.

A printing apparatus according to a first exemplary embodiment reads image data of a target document from the storage device before image data for one page of the target document has been stored in the storage device, and then performs printing based on the read image data.

This printing apparatus performs, according to occurrence of an interruption factor before image data for one page of the target document has been stored in the storage device, control to store specific data in the storage area of the storage device in which the remaining image data of the target document is to be stored. If an interruption factor occurs before image data for one page of the target document has been stored in the storage device, the printing apparatus performs printing based on the image data of the target document and specific data stored in the storage device.

This operation will be described in detail below.

A configuration of a multifunctional peripheral (MFP) 103 as an example of a printing apparatus according to the first exemplary embodiment will be described below with reference to the block diagram illustrated in FIG. 1.

The MFP 103 is provided with a copy function of reading a document, generating image data, and printing an image on a sheet based on the generated image data. The MFP 103 is also provided with a personal computer (PC) print function of receiving a print job from an external apparatus such as a PC and printing text and an image on a sheet based on data for which a print instruction is received. A print function may perform color or monochrome printing.

A controller unit 110 of the MFP 103 is connected with a scanner unit (a reading unit) 130 as an image input device and a printer unit or printing device 140 as an image output device, and controls input and output of image information.

The scanner unit 130 scans an image of a document by using an optical sensor to acquire scan image data.

The scanner unit 130 includes a control unit or controller 135 and a scanner device 136. The controller 135 includes a central processing unit (CPU) 131, a random access memory (RAM) 132, a read only memory (ROM) 133, and a device interface (I/F) 134. The CPU 131 loads a control program from the ROM 133 into the RAM 132 and then executes it to control operations of the scanner unit 130.

The device I/F 134 includes a circuit for outputting a video signal of a scan image (hereinafter, referred to as a "video output circuit"). Changing settings of various types of registers included in the video output circuit enables outputting the video signal of the scan image as it is, generating and outputting data (video signal) composed of black pixels, and generating and outputting data (video signal) composed of white pixels. Then, the video signal of the scan image output via the device I/F 134 is input to the controller unit 110.

A device I/F 116 connects the scanner unit 130 and the controller unit 110, and converts image data between a synchronous system and an asynchronous system. The scanner device 136 of the scanner unit 130 will be described in detail below with reference to FIG. 2.

The printer unit or printing device 140 prints an image on a sheet based on image data input from the scanner unit 130, a PC, etc. The printing device 140 will be described in detail below with reference to FIG. 2.

The controller unit 110 is connected with an operation unit 150 serving as an example of a user interface unit. The operation unit 150 includes a display unit and a key input unit. The operation unit 150 provides a user with information via the display unit. The display unit includes a liquid crystal display (LCD) and a touch panel sheet on the LCD. The operation unit 150 receives various settings from the user via the touch panel sheet. The LCD displays operation screens and the status of the MFP 103. The key input unit is provided with, for example, a start key for giving an instruction to start execution of scan and copy operations, and a stop key for giving an instruction to cancel scan and copy operations currently being executed.

The controller unit 110 is connected with an external apparatus (e.g., an information processing apparatus) such as a PC and a file sharing server via a network 104 and performs processing such as reception of a print job from an external apparatus. The network 104 may be a local area network (LAN) or a wide area network (WAN) such as the Internet.

The controller unit 110 includes a CPU 111, a RAM 112, a ROM 113, a hard disk drive (HDD) 114, a network I/F 115, a device I/F 116, an operation unit I/F 117, an image processing unit 118, and an image memory 120. Each module is connected via a system bus 125.

The CPU 111 integrally controls the MFP 103 based on a control program stored in the ROM 113.

The network I/F 115 is an interface for controlling communication with an external network. The network I/F 115 connects the MFP 103 to the network 104 and performs communication control for transmitting image data input from the scanner unit 130 to an external apparatus such as a PC and a file sharing server.

The HDD 114 is a storage unit or storage device for mainly storing information (e.g., system software) required to activate and operate a computer and image data. The HDD 114 stores setting information of a job (e.g., a copy job) received from the user via the operation unit 150.

The RAM 112 is a readable and writable memory. The RAM 112 is also a system work memory for the CPU 111 to operate. The RAM 112 stores image data input from the scanner unit 130 and a PC and various programs and setting information.

The ROM 113 is a read only memory and may also be a boot ROM. The ROM 113 pre-stores the boot program of the system.

The ROM 113 or the HDD 114 stores various control programs required to perform various processing of flowcharts (described below) to be executed by the CPU 111.

The ROM 113 or the HDD 114 also stores a program for performing rasterization.

The ROM 113 or the HDD 114 also stores a display control program for displaying various user interface (UI) screens on the display unit of the operation unit 150 including user interface screens (hereinafter, referred to as UI screens).

Various operations according to the present exemplary embodiment are implemented when the CPU 111 reads a program stored in the ROM 113 or the HDD 114, loads the program into the RAM 112, and executes it.

The device I/F 116 connects the controller unit 110 with the scanner 130 and the printing device 140, and converts image data between a synchronous system and an asynchronous system.

The operation unit I/F 117 is an interface for connecting the operation unit 150 and the controller unit 110, and outputs image data to be displayed on the operation unit 150 to the operation unit 150. The operation unit I/F 117 also transmits information input by the user via the operation unit 150, to the CPU 111.

The image processing unit 118 performs image processing on image data included in printing data received via the network 104 and also performs image processing on image data output to and input from the device I/F 116.

The image processing unit 118 stores in the image memory 120 image data included in the printing data received via the network 104 or image data generated through document reading by the scanner unit 130. The image processing unit 118 performs image conversion processing on the image data stored in the image memory 120 based on register values (e.g., color mode, scaling factor, reading resolution, output resolution, rotational angle, etc.) in an image processing circuit. In the present exemplary embodiment, the image conversion processing includes, for example, rotation processing, resolution conversion processing, and scaling processing. Then, the image processing unit 118 stores the converted image data in the image memory 120 again.

A compression/decompression unit 119 performs processing for compressing/decompressing image data stored in the image memory 120 and processing for decompressing image data stored in the HDD 114 based on various compression methods such as Joint Bi-level Image Experts Group (JBIG) and Joint Photographic Experts Group (JPEG). The compression/decompression unit 119 includes an image processing block for storing compressed image data and decompressed image data in the image memory 120 and/or the HDD 114 again.

The image memory 120 is a memory (i.e., storage unit or device) for temporarily rasterizing the image data to be processed by the image processing unit 118 and storing the rasterized image data. The image memory 120 includes areas for storing low compression image data (a first image memory area 121 and a fourth image memory area 124) and areas for storing encoded image data (a second image memory area 122 and a third image memory area 123).

An address for storing image data in the image memory 120 is specified for each page of the image data. The RAM 112 stores information about which page of the image data is stored in which area having address of the image memory 120.

The first image memory area 121 is an area specified, for example, with address "0x20000000" (hereinafter, also referred to as an address (a)). When the size of the low compression image data to be stored in the image memory 120 is 133 megabytes (MB), an area for 133 MB is allocated from address "0x20000000".

The second image memory area 122 is an area specified, for example, with address "0x70000000" (hereinafter, also referred to as an address (b)). When the size of the encoded image data to be stored in the image memory 120 is 25 MB, an area for 25 MB is allocated from address "0x70000000".

The third image memory area 123 is an area specified, for example, with address "0x80000000" (hereinafter, also referred to as an address (c)). When the size of the encoded image data to be stored in the image memory 120 is 25 MB, an area for 25 MB is allocated from address "0x80000000".

The fourth image memory area 124 is an area specified, for example, with address "0x90000000" (hereinafter, also referred to as an address (d)). When the size of the low compression image data to be stored in the image memory 120 is 133 MB, an area for 133 MB is allocated from address "0x90000000".

The sizes of the areas to be allocated in the image memory 120 are as follows. An area of the same size is allocated in each of the first image memory area 121 and the fourth image memory area 124, and an area of the same size is allocated in each of the second image memory area 122 and the third image memory area 123.

The sizes to be allocated as the first image memory area 121, the second image memory area 122, the third image memory area 123, and the fourth image memory area 124 may be variable according to the compression ratio and size of image data. In the image memory 120, the four areas (the first image memory area 121, the second image memory area 122, the third image memory area 123, and the fourth image memory area 124) for storing image data may be consecutively allocated.

The configuration of the MFP 103 will be described below with reference to the sectional diagram illustrated in FIG. 2. The MFP 103 includes the scanner 130 and the printing device 140.

First, operations of the scanner unit 130 will be described below with reference to the sectional diagram illustrated in FIG. 2. The scanner unit, or simply scanner, 130 performs the scanning or reading function and may be referred to as a reading unit or a reader.

The scanner device 136 of the scanner unit 130 includes an automatic document feeder 450. The automatic document feeder 450 is provided with a document tray 30 for stacking a document 32, and feeds the document 32 placed on the document tray 30. Then, the scanner unit 130 reads an image of the fed document 32 at the position of the fixed optical system. The scanner unit 130 will be described in detail below.

The automatic document feeder 450 includes the document tray 30 for stacking a document bundle including at least one document 32, a separation pad 21 for preventing the document bundle from protruding from the document tray 30 and advancing toward the downstream before the conveyance of the document 32 is started, and a feed roller 1.

The feed roller 1 drops onto the document surface of the document bundle stacked on the document tray 30 and rotates. Thus, the document 32 at the top of the document bundle is fed. A plurality of the documents 32 fed by the feed roller 1 is separated one by one by the actions of a separation roller 2 and the separation pad 21. This separation is achieved by a known retard separation technique.

The document 32 separated by the separation roller 2 and the separation pad 21 is conveyed to a registration roller 4 by a conveyance roller pair 3. Then, the conveyed document 32 is abutted to the registration roller 4. This cancels skew in the conveyance of the document 32. A conveyance path for conveying the document 32, which has passed the registration roller 4, toward a feeding-reading glass 201 is disposed on the downstream side of the registration roller 4.

The document 32 fed to the conveyance path is then fed to the platen by a large roller 7 and a feed roller 5. The large roller 7 contacts the feeding-reading glass 201. Then, the scanner unit 130 reads an image on the surface of the document 32 while it is passing over the feeding-reading glass 201. The document 32 fed by the large roller 7 passes the conveyance roller 6 and moves between a roller 16 and a discharge flapper. Then, the document 32 is discharged onto a document discharge tray 31 via the discharge flapper and a discharge roller 8.

The scanner unit 130 is able to read an image on the reverse side of the document 32 by reversing the document 32. More specifically, the discharge roller 8 is reversed in a state where the document 32 is caught by the discharge roller 8 to switch the discharge flapper. Thereby, the document 32 is moved to a reversing path 19. The document 32, which has moved to the reversing path 19, is abutted from the reversing path 19 to the registration roller 4. This cancels skew in the conveyance of the document 32 again. Then, the document 32 is moved again to the feeding-reading glass 201 by the feed roller 5 and the large roller 7. Then, the scanner unit 130 reads an image on the reverse side of the document 32 while it is passing over the feeding-reading glass 201.

Figure 2:
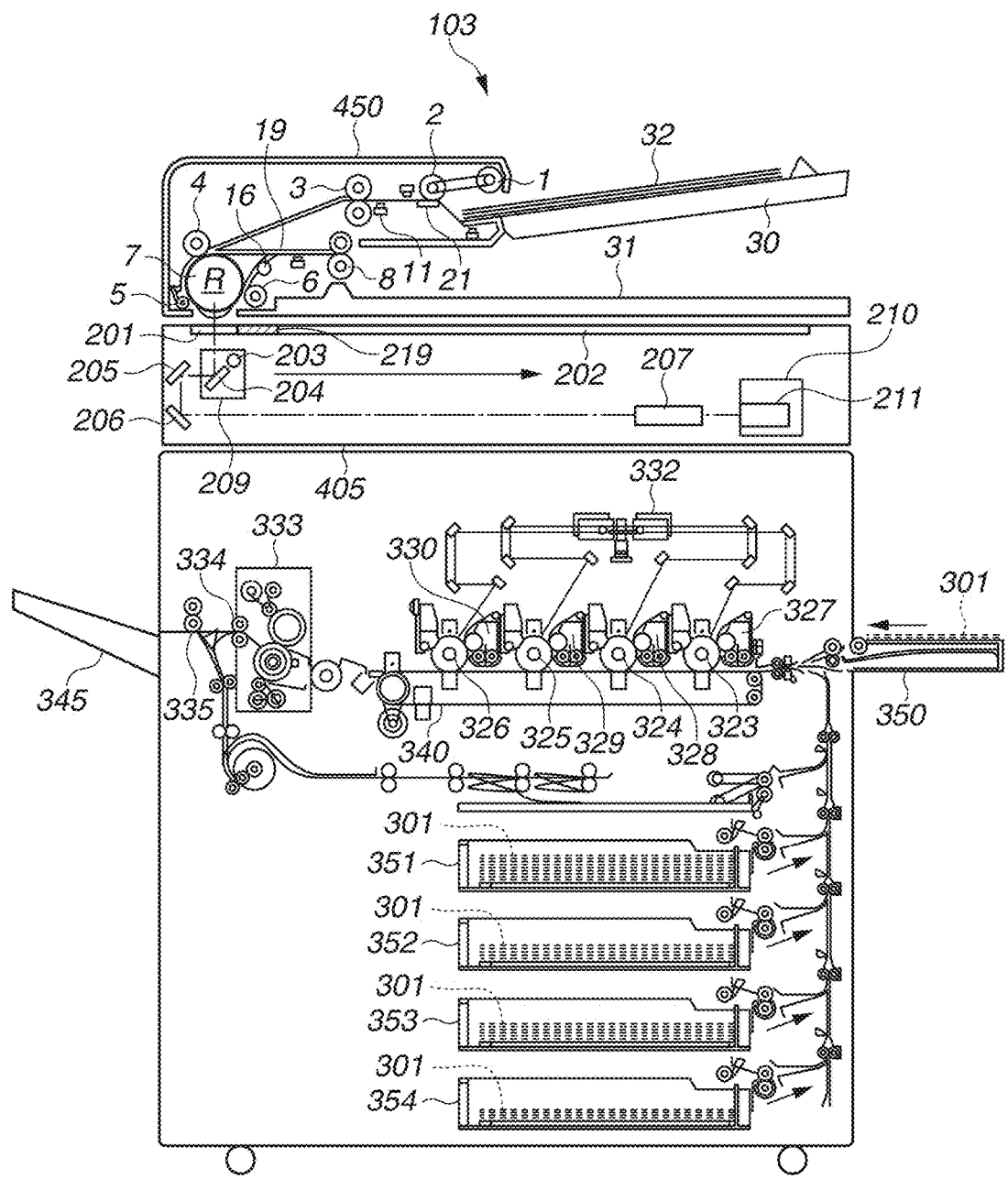
FIG. 2 is a sectional diagram illustrating the configuration of the MFP according to the present exemplary embodiment.

On the other hand, when reading a document placed on a document positioning glass plate 202 by the user, the scanner unit 130 causes an optical scanner unit 209 to scan the document placed on the document positioning glass plate 202 in the sub-scanning direction indicated by the arrow illustrated in FIG. 2. Thus, the scanner unit 130 optically reads image information recorded on the document. The document 32 on the document tray 30 or on the document positioning glass plate 202 is read by the following optical system. This optical system includes the feeding-reading glass 201, the document positioning glass plate 202, the optical scanner unit 209 (including an optical lamp 203 and a mirror 204), mirrors 205 and 206, a lens 207, and a charge coupled device (CCD) sensor unit 210. In the present exemplary embodiment, the CCD sensor unit 210 includes a CCD 211 (red, green, and blue (RGB) CCDs (i.e., three-line sensor unit)) for reading a color image and a CCD (one-line sensor unit) for reading a monochrome image.

Image information read by the optical system undergoes photoelectric conversion and is input as image data to the controller unit 110 illustrated in FIG. 1. Although, in the present exemplary embodiment, the optical system included in the scanner unit 130 is described to be a reduction optical system for focusing reflected light from the document 32 on the CCD sensor, the configuration is not limited thereto. The optical system included in the scanner unit 130 may be an equal magnification optical system for focusing reflected light from the document 32 on a contact image sensor (CIS).

Next, operations of the printing device 140, shown in FIG. 1, will be described below with reference to the sectional diagram illustrated in FIG. 2. The printing device 140 performs an operation (e.g., print operation) for outputting an image onto a sheet 301 based on image data transmitted to the printing device 140. The printing device 140 will be described in detail below.

The image data transmitted to the printing device 140 is converted into laser light according to the image data by the laser unit 332. Photosensitive drums 323 to 326 are irradiated with the laser light, and electrostatic latent images according to the image data are formed on the photosensitive drums 323 to 326. Developing units 327 to 330 causes toner (i.e., developing agent) to adhere to the latent image portions on the photosensitive drums 323 to 326. A color machine includes four photosensitive drums 323 to 326 and four developing units 327 to 330 for cyan, yellow, magenta, and black, respectively.

The printing device 140 is also provided with cassettes 351 to 354 as sheet storage units (also referred to as paper feed stages) and a manual feed tray 350.

The cassettes 351 to 354 are able to store a plurality of sheets 301 (e.g., 600 sheets). On the other hand, the manual feed tray 350 is able to store a plurality of sheets 301 (e.g., 100 sheets).

The printing device 140 transfers toner adhering to the photosensitive drums 323 to 326 onto the sheet 301 fed from any one of the cassettes 351 to 354 and the manual feed tray 350. Then, the sheet 301 with toner transferred thereon is conveyed to the fixing unit 333. Then, toner is fixed onto the sheet 301 by heat and pressure. The sheet 301, which has passed through the fixing unit 333, is discharged onto a discharge tray 345 (discharge unit) included in the MFP 103 by the conveyance rollers 334 and 335. Although the MFP 103 is described to be a color machine including four photosensitive drums 323 to 326 and four developing units 327 to 330, the MFP 103 is not limited thereto. Even if the MFP 103 is a monochrome machine including one photosensitive drum 326 and one developing unit 330, the disclosure is similarly applicable.

Although, in the above-described example, an image is printed on the sheet 301 through the electro-photographic method, the printing method is not limited thereto. As long as an image can be printed on the sheet 301, the disclosure is similarly applicable to any other methods such as an ink-jet method and a heat transfer method.

Next, with reference to the schematic diagram illustrated in FIG. 3A, a series of processing (steps S3001 to S3003) performed since the video signal is input from the scanner unit 130 until the encoded image data is stored in the HDD 114, will be described.

Figure 3A:
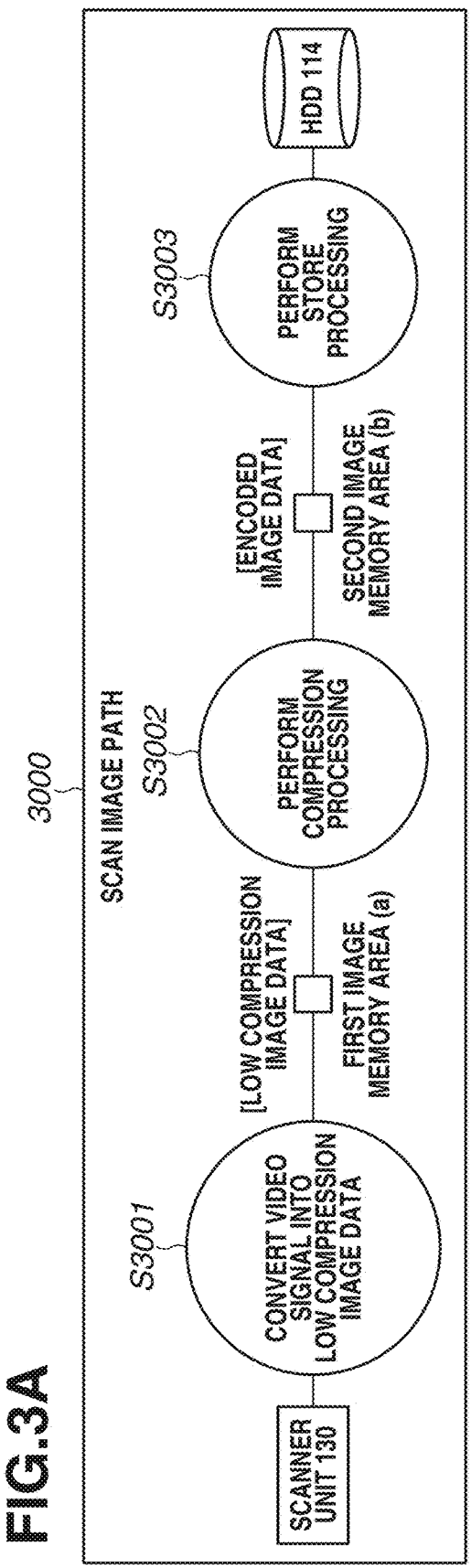
FIGS. 3A and 3B are schematic diagrams illustrating examples of control according to a first exemplary embodiment.

The CPU 111 sets a scan image path 3000 illustrated in FIG. 3A, in which the order of image processing and the order of image areas for scanning are specified. After setting the scan image path 3000, the CPU 111 performs processing in steps S3001 to S3003. The CPU 111 sets various parameters for performing image processing (described below) by the image processing unit 118 in steps S3001 to S3003.

In step S3001, the CPU 111 performs processing for converting the video signal input from the scanner unit 130 into low compression image data. The low compression image data converted in step S3001 is stored in the first image memory area 121, which is referred to by the address (a) of the image memory 120.

In step S3002, the CPU 111 performs compression processing for compressing the low compression image data stored in the first image memory area 121 by the compression/decompression unit 119 to generate encoded image data. The low compression image data refers to image data having a low compression ratio. The low compression image data may be image data not compressed (non-compressing image data). On the other hand, the encoded image data refers to image data having a higher compression ratio than that of the low compression image data. More specifically, the low compression image data is larger in data amount than the encoded image data. The encoded image data generated in step S3002 is stored in the second image memory area 122, which is referred to by the address (b) of the image memory 120.

In step S3003, the CPU 111 performs processing for storing in the HDD 114 the encoded image data stored in the second image memory area 122. The processing in step S3003 enables storing in the second image memory area 122 the encoded image data of the second page of the document following the first page without waiting for completion of reading of the encoded image data of the first page of the document stored in the second image memory area 122. Therefore, it is possible to prevent delay of the start of reading the second page of the document following the first page.

When starting the scan processing, the CPU 111 allocates resources for storing data in each of the first image memory area 121, the second image memory area 122, and the HDD 114. For example, it is assumed that the size of the target document is "A4" and the reading resolution is "600 dots per inch (dpi)" (32 bits per pixel). In this case, for the first image memory area 121, the CPU 111 allocates a resource, for example, for storing data of 133 MB (low compression image data). On the other hand, for the second image memory area 122, the CPU 111 allocates a resource, for example, for storing data for 25 MB (encoded image data).

Upon completion of the compression processing in step S3002, the CPU 111 releases the resource of the first image memory area 121. Upon completion of the store processing in step S3003, the CPU 111 releases the resource of the second image memory area 122.

When the resource of the first image memory area 121 is released, it becomes possible to overwrite data onto the first image memory area 121 for other processing. When the resource of the second image memory area 122 is released, it becomes possible to overwrite data onto the second image memory area 122 for other processing. Releasing respective resources of the first image memory area 121 and the second image memory area 122 in this way prevents the image memory 120 from overflowing. There may be a modification in which, when the resource of the first image memory area 121 is released, the low compression image data stored in the first image memory area 121 is deleted. Similarly, there may be a modification in which, when the resource of the second image memory area 122 is released, the encoded image data stored in the second image memory area 122 is deleted.

Allocation and release of an area for storing data in the image memory 120 will be described below with reference to the schematic diagrams illustrated in FIGS. 4A and 4B.

FIG. 4A illustrates a state where resources of the first image memory area 121 and the second image memory area 122 are respectively allocated in the image memory 120.

The first image memory area 121 is an area, for example, specified by address "0x20000000". When the size of the low compression image data to be stored in the image memory 120 is 133 MB, an area for 133 MB is allocated from address "0x20000000".

The second image memory area 122 is an area, for example, specified by address "0x70000000". When the size of the encoded image data to be stored in the image memory 120 is 25 MB, an area for 25 MB is allocated from address "0x70000000".

FIG. 4B illustrates a state where only the resource of the second image memory area 122 is allocated in the image memory 120 and where the resource of the first image memory area 121 is released from the image memory 120. Thus, for example, the first image memory area 121 specified by address "0x20000000" can be allocated a resource of the image memory 120 for the scan processing on other page.

Next, with reference to the schematic diagram illustrated in FIG. 3B, a series of processing (steps S4001 to S4003) performed since data is read from the image memory 120 or the HDD 114 until the video signal is output to the printing device 140, will be described.

Figure 3B:
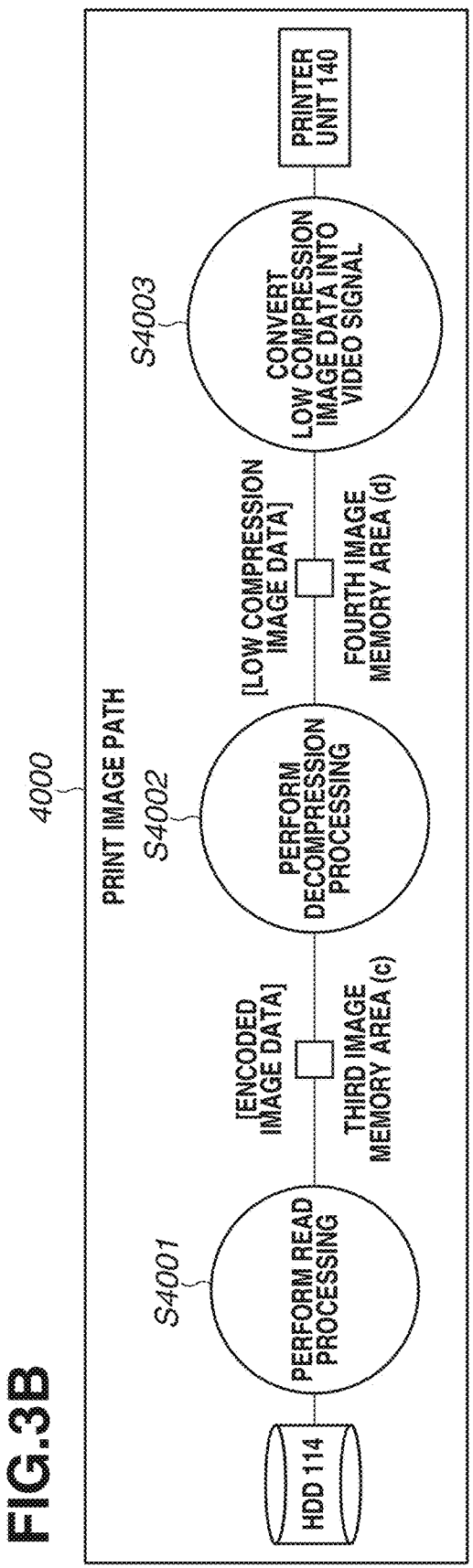

The CPU 111 sets a print image path 4000 illustrated in FIG. 3B, in which the order of image processing and the order of image areas for printing are specified. After setting the print image path 4000, the CPU 111 performs processing in steps S4001 to S4003. The CPU 111 sets various parameters for performing image processing (described below) in steps S4001 to S4003 by the image processing unit 118.

In step S4001, the CPU 111 performs processing for reading the encoded image data stored in the HDD 114. The encoded image data read from the HDD 114 in step S4001 is stored in the third image memory area 123, which is referred to by the address (c) of the image memory 120.

In step S4002, the CPU 111 performs decompression processing for decompressing the encoded image data stored in the third image memory area 123 by the compression/decompression unit 119 to generate low compression image data. The low compression image data generated in step S4002 is stored in the fourth image memory area 124, which is referred to by the address (d) of the image memory 120.

In step S4003, the CPU 111 performs processing for converting the low compression image data stored in the fourth image memory area 124 into a video signal and outputting the video signal to the printing device 140.

When starting the print processing, the CPU 111 allocates a resource for storing data in each of the third image memory area 123, the fourth image memory area 124, and the HDD 114 thereto.

First, a case is described in which, at the execution timing of the print processing, the resource of the first image memory area 121 storing the low compression image data for the same page of the document is not released. In this case, the CPU 111 changes the address of the image memory 120 for reading the low compression image data, more specifically, the CPU 111 changes the address (d) for referring to the fourth image memory area 124 to the address (a) for referring to the first image memory area 121.

More specifically, as preprocessing for outputting the video signal to the printing device 140, the CPU 111 only needs to read the low compression image data stored in the area specified by the address (a) of the image memory 120. In other words, since the CPU 111 acquires the low compression image data stored in the first image memory area 121, the processing in steps S4001 and S4002 (illustrated in FIG. 3B) can be omitted. This enables reducing the time until image printing onto a sheet is started in comparison with a case where processing in all of steps S4001 to S4003 is performed.

When the address of the image memory 120 for reading the low compression image data is changed to the first image memory area 121, the low compression image data for the same page of the document is not stored in the fourth image memory area 124. Since the once allocated resource of the fourth image memory area 124 is no longer necessary, the CPU 111 releases the resource of the fourth image memory area 124. When the address of the image memory 120 for reading the low compression image data is changed to the first image memory area 121, the encoded image data for the same page of the document is not stored in the third image memory area 123. Since the once allocated resource of the third image memory area 123 is no longer necessary, the CPU 111 releases the resource of the third image memory area 123. Releasing a resource of the image memory 120, which is no longer necessary in this way, enables allocating a resource of the image memory 120 for the scan processing on other page.

Next, a case is described in which, at the execution timing of the print processing, the resource of the first image memory area 121 storing the low compression image data for the same page of the document is released. A case is described in which, at the execution timing of the print processing, the resource of the second image memory area 122 storing the encoded image data for the same page of the document is not released. In this case, the CPU 111 changes the address of the image memory 120 for reading the encoded image data, more specifically, the CPU 111 changes the address (c) for referring to the third memory area 123 to the address (b) for referring to the second image memory area 122.

More specifically, as preprocessing for outputting the video signal to the printing device 140, the CPU 111 only needs to read the encoded image data stored in the area specified by the address (b) of the image memory 120. In other words, since the CPU 111 acquires the encoded image data stored in the second image memory area 122, the processing in step S4001 (illustrated in FIG. 3B) can be omitted. This enables reducing the time until image printing onto a sheet is started in comparison with a case where processing in all of steps S4001 to S4003 is performed.

When the address of the image memory 120 for reading the encoded image data is changed, the encoded image data is not stored in the third image memory area 123. Since the once allocated resource of the third image memory area 123 is no longer necessary, the CPU 111 releases the resource of the third image memory area 123. Releasing a resource of the image memory 120, which is no longer necessary in this way, enables allocating a resource of the image memory 120 for the scan processing on other page.

Next, a case is described in which, at the execution timing of the print processing, the resource of the first image memory area 121 storing the low compression image data for the same page of the document is released, and the resource of the second image memory area 122 storing the encoded image data for the same page of the document is released. In this case, the CPU 111 reads the encoded image data from the HDD 114 and performs processing in steps S4001, S4002, and S4003.

The order of the scan processing performed by the MFP 103 according to the first exemplary embodiment will be described below with reference to the schematic diagrams illustrated in FIGS. 5A to 5D. In these figures, a shaded area indicates the corresponding operation has already been completed.

FIG. 5A illustrates a phase in which the processing in step S3001 is performed and the low compression image data is stored in the first image memory area 121.

FIG. 5B illustrates a phase in which, after the low compression image data is stored in the first image memory area 121, the processing in step S3002 is performed and the encoded image data is stored in the second image memory area 122.

FIG. 5C illustrates a phase in which, after the encoded image data is stored in the second image memory area 122, the processing in step S3003 is performed and the encoded image data is stored in the HDD 114. At this timing, the resource of the first image memory area 121 has been released, making it possible to allocate resource of the first image memory area 121 to the scan processing on other page.

FIG. 5D illustrates a state in which the scan processing is completed and the encoded image data is stored in the HDD 114. At this timing, the resources of the first image memory area 121 and the second image memory area 122 have been released, making it possible to allocate resources of the first image memory area 121 and the second image memory area 122 to the scan processing on other page.

Next, with reference to the schematic diagrams illustrated in FIGS. 6A to 6D, the order of processing when the scan processing and the print processing are operated in parallel during copy operation by the MFP 103 according to the first exemplary embodiment. FIGS. 6A to 6D illustrate that the print processing is started in the phases illustrated in FIGS. 5A to 5D, respectively.

In the MFP 103 according to the first exemplary embodiment, the speed of storing image data in the image memory 120 through document reading is assumed to be higher than the speed of reading image data from the image memory 120 for printing.

The copy processing according to the first exemplary embodiment will be described below on the premise that setting is made in such a manner the address (d) for referring to the fourth image memory area 124 can be changed to the address (a) for referring to the first image memory area 121.

Further, the copy processing according to the first exemplary embodiment will be described below on the premise that setting is made in such a manner that the address (c) for referring to the third image memory area 123 can be changed to the address (b) for referring to the second image memory area 122.

FIG. 6A illustrates details of the copy processing when the print processing is started in the scan processing phase illustrated in FIG. 5A. In this copy processing phase (hereinafter, referred to as a "copy parallel processing mode"), the address (d) for referring to the fourth image memory area 124 is changed to the address for referring to the address (a) for referring to the first image memory area 121. In step S4003, the CPU 111 reads the low compression image data stored in the first image memory area 121. More specifically, in the copy processing illustrated in FIG. 6A, the CPU 111 performs the copy processing only through the processing in step S3001 illustrated in FIG. 3A and the processing in step S4003 illustrated in FIG. 3B.

More specifically, in the print processing illustrated in FIG. 6A, the CPU 111 acquires the low compression image data stored in the first image memory area 121 and therefore the processing in steps S4001 and S4002 (illustrated in FIG. 3B) can be omitted. This enables reducing the time until image printing onto a sheet is started in comparison with a case where processing in all of steps S4001 to S4003 is performed.

In the scan processing illustrated in FIG. 6A, the CPU 111 performs up to the processing in steps S3002 and S3003 (illustrated in FIG. 3A) to store the encoded image data in the HDD 114. With the encoded image data being stored in the HDD 114 in this way, even if a failure (e.g., a print jam) occurs during the print processing, it is possible to restart the print processing after recovering from the failure.

FIG. 6B illustrates details of the copy processing when the print processing is started in the scan processing phase illustrated in FIG. 5B. In this copy processing phase, the processing in step S3001 is completed, as shown in the shaded area, and the processing in step S3002 is in progress. More specifically, in this phase, the resource of the first image memory area 121 is in use for the processing in step S3002. In other words, in this phase, the resource of the first image memory area 121 has not yet been released. Therefore, in the copy processing illustrated in FIG. 6B, the address (d) for referring to the fourth image memory area 124 is changed to the address for referring to the address (a) for referring to the first image memory area 121, as with the copy processing illustrated in FIG. 6A. In step S4003, the CPU 111 reads the corresponding low compression image data stored in the first image memory area 121. More specifically, in the copy processing illustrated in FIG. 6B, the CPU 111 performs the copy processing only through the processing in step S3001 and the processing in step S4003.

More specifically, in the print processing illustrated in FIG. 6B, the CPU 111 acquires the low compression image data stored in the first image memory area 121 and therefore the processing in steps S4001 and S4002 (illustrated in FIG. 3B) can be omitted. This enables reducing the time until image printing onto a sheet is started in comparison with a case where processing in all of steps S4001 to S4003 is performed.

In the scan processing illustrated in FIG. 6B, the CPU 111 performs up to the processing in step S3003 to store the encoded image data in the HDD 114. With the encoded image data being stored in the HDD 114 in this way, even if a failure (e.g., a print jam) occurs during the print processing, it is possible to restart the print processing after recovering from the failure.

FIG. 6C illustrates details of the copy processing when the print processing is started during the scan processing phase illustrated in FIG. 5C. In this copy processing phase, the processing in steps S3001 and S3002 is completed, as shown in the shaded areas, and the processing in step S3003 is in progress. More specifically, in this phase, the resource of the second image memory area 122 is in use for the processing in step S3003. In other words, in this phase, the resource of the second image memory area 122 has not yet been released. On the other hand, in this phase, the resource of the first image memory area 121 has been released. Therefore, in the copy processing illustrated in FIG. 6C, the address (c) for referring to the third image memory area 123 is changed to the address for referring to the address (b) for referring to the second image memory area 122. In step S4002, the CPU 111 reads the encoded image data stored in the second image memory area 122. More specifically, in the copy processing illustrated in FIG. 6C, the CPU 111 performs the copy processing in steps S3001, S3002, S4002, and S4003.

More specifically, in the print processing illustrated in FIG. 6C, the CPU 111 acquires the encoded image data stored in the second image memory area 122 and therefore the processing in step S4001 (illustrated in FIG. 3) can be omitted. This enables reducing the time until image printing onto a sheet is started in comparison with a case where processing in all of steps S4001 to S4003 is performed.

In the scan processing illustrated in FIG. 6C, the CPU 111 performs up to the processing in step S3003 to store the encoded image data in the HDD 114. With the encoded image data being stored in the HDD 114 in this way, even if a failure (for example, a print jam) occurs during the print processing, it is possible to restart the print processing after recovering from the failure.

FIG. 6D illustrates details of the copy processing when the print processing is started during the scan processing phase illustrated in FIG. 5D. In this copy processing phase, the processing in steps S3001, S3002, and S3003 is completed, as shown in the shaded areas. More specifically, in this phase, the resource of the first image memory area 121 has been released and the resource of the second image memory area 122 has also been released. In this phase, further, the encoded image data has been stored in the HDD 114. Therefore, in the copy processing illustrated in FIG. 6D, the address for referring to the image memory 120 remains unchanged. More specifically, after reading the encoded image data stored in the HDD 114, the CPU 111 performs the copy processing in the processing in steps S4001, S4002, and S4003.

In the copy processing illustrated in FIG. 6D, it is possible to store in the second image memory area 122 the encoded image data of the second page of the document following the first page without waiting for completion of reading of the encoded image data of the first page of the document stored in the second image memory area 122. Thus, it becomes possible to prevent delay of the start of reading the second page of the document following the first page. The resource of the second image memory area 122 is released when the encoded image data stored in the second image memory area 122 is stored in the HDD 114. This prevents the image memory 120 from overflowing.

Figure 7:
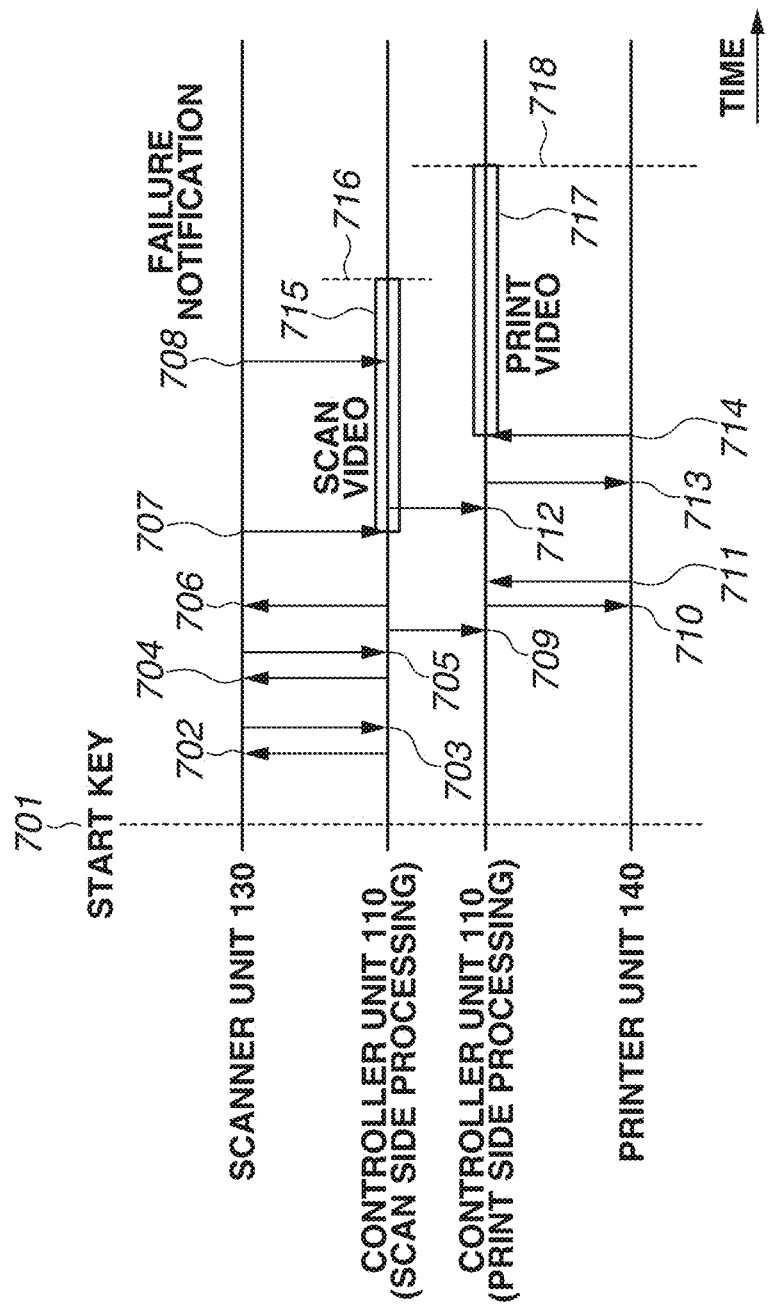
FIG. 7 is a schematic diagram illustrating an example of control according to the first exemplary embodiment.

Next, a timing chart of the copy processing in the copy processing phase (copy parallel processing mode) illustrated in FIG. 6A will be described below with reference to the schematic diagram illustrated in FIG. 7.

At a timing 701, a copy job is started when the start key is pressed.

At a timing 718, video signal output ends.

In the first exemplary embodiment, the MFP 103 operates in the copy parallel processing mode to reduce the time between the timings 701 and 718.

Commands 702, 703, 704, 705, and 706 are commands exchanged between the device I/F 134 of the scanner unit 130 and the device I/F 116 of the controller unit 110. The commands 702 to 706 are also commands exchanged between the controller unit 110 and the controller 135 of the scanner unit 130 to operate in synchronization with each other.

The command 702 is a request for preparing to pull in the document 32. Upon reception of the command 702, the controller 135 of the scanner unit 130 performs initial setting for pulling in the document 32 stacked on the document tray 30.

The command 703 is a response command to the command 702. Upon reception of the command 702, the controller unit 110 determines that the pull-in of the document 32 has been prepared. Upon reception of the command 702, the CPU 111 of the controller unit 110 sets the scan image path 3000 illustrated in FIG. 3A, which specifies the order of image processing and the order of image areas for scanning.

The command 704 is a request for starting pulling in the document 32. Upon reception of the command 704, the controller 135 of the scanner unit 130 starts pulling in the document 32 stacked on the document tray 30.

The command 705 is a response command to the command 704. Upon reception of the command 705, the controller unit 110 determines that the pull-in of the document 32 has been started. At this timing, the controller 135 of the scanner unit 130 may notify the controller unit 110 of information that the pull-in of the document 32 has normally started.

The command 706 is a scan video request command for requesting to input the video signal of the scan image from the scanner unit 130. The command 706 corresponds to a command issued by the CPU 111 of the controller unit 110 to instruct the scanner unit 130 to read the document 32.

An interrupt 707 is an interrupt for starting video signal input. After the controller unit 110 is notified of the interrupt 707, the video signal of the scan image is continuously input to the controller unit 110. Then, the video signal of the scan image input to the controller unit 110 undergoes image processing by the image processing unit 118 of the controller unit 110.

A video 715 illustrates the video signal of the scan image.

At a timing 716, the video signal of the scan image ends.

Commands 710, 711, and 713 are commands exchanged between the printing device 140 and the device I/F 116 of the controller unit 110.

The command 710 is a paper feed start request. Upon reception of the command 710, the printing device 140 starts conveying a sheet stored in any one of the cassettes 351 to 354 or a sheet set on the manual feed tray 350.

The command 711 is a response command to the command 710. Upon reception of the command 711, the controller unit 110 determines that feeding has been started.

The command 713 is a print video request command for requesting to start outputting a video signal of a print image to the printing device 140. The command 713 corresponds to a command issued by the CPU 111 of the controller unit 110 to instruct the printing device 140 to perform printing.

An interrupt 714 is an interrupt for starting print video. After the controller unit 110 is notified of the interrupt 714, the video signal of the print image is continuously input to the printing device 140. The printing device 140 performs a print operation based on the video signal of the print image input to the printing device 140.

A video 717 illustrates the video signal of the print image.

An event 709 is a print preparation start event. When the controller unit 110 receives the event 709, it notifies the printing device 140 of the command 710. When the CPU 111 of the controller unit 110 receives the event 709, the CPU 111 sets the print image path 4000 for specifying the order of image processing and the order of the image areas for printing, as illustrated in FIG. 3B. The CPU 111 also sets various parameters for performing the image processing in steps S4001 to S4003 (illustrated in FIG. 3B) to the image processing unit 118, and allocates resources that is to be allocated in the image memory areas of the image memory 120.

When the MFP 103 is operating in the copy parallel processing mode, the scan side processing (of the controller 110) receives the command 705 and then notifies the print side processing of the event 709.

An event 712 is an event for starting print processing. When the controller unit 110 receives the event 712, it notifies the printing device 140 of the command 713. The event 712 occurs when the controller unit 110 is notified of the interrupt 707.

If a failure (hereinafter, also referred to as an interruption factor) occurs during execution of the scan processing, the controller unit 110 is notified of a failure notification 708, indicating that a failure occurred, via the device I/F 134 of the scanner unit 130 and the device I/F 116 of the controller unit 110.

Errors, which may occur during execution of the scan processing, include a jam of the document 32, an error due to incorrect size detection of the document 32, an error due to double feed detection, an error due to stopped scan processing, and a scan video signal error due to electrical noise.

An error due to double feed detection occurs in a case where the automatic document feeder 450 is provided with a double feed detection sensor such as an ultrasonic sensor and where the double feed detection sensor detects the occurrence of double feed of the document 32 fed from the automatic document feeder 450.

An error due to stopped scan processing occurs upon reception of the pressing of the stop key (for stopping image reading from the document 32) from the user via the operation unit 150 during image reading from the document 32.

A scan video signal error due to electrical noise occurs when the video output circuit included in the device I/F 134 of the controller 135 of the scanner unit 130 generates the video signal of the scan image.

Figure 14A:
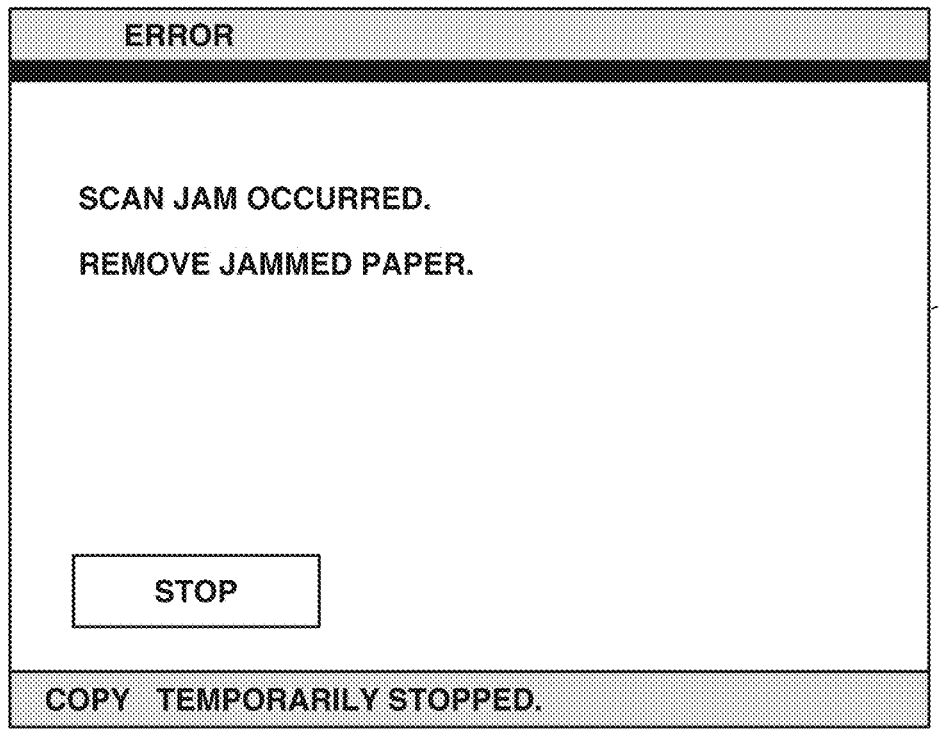
FIGS. 14A and 14B illustrate configurations of screens according to the first exemplary embodiment.
Figure 14B:
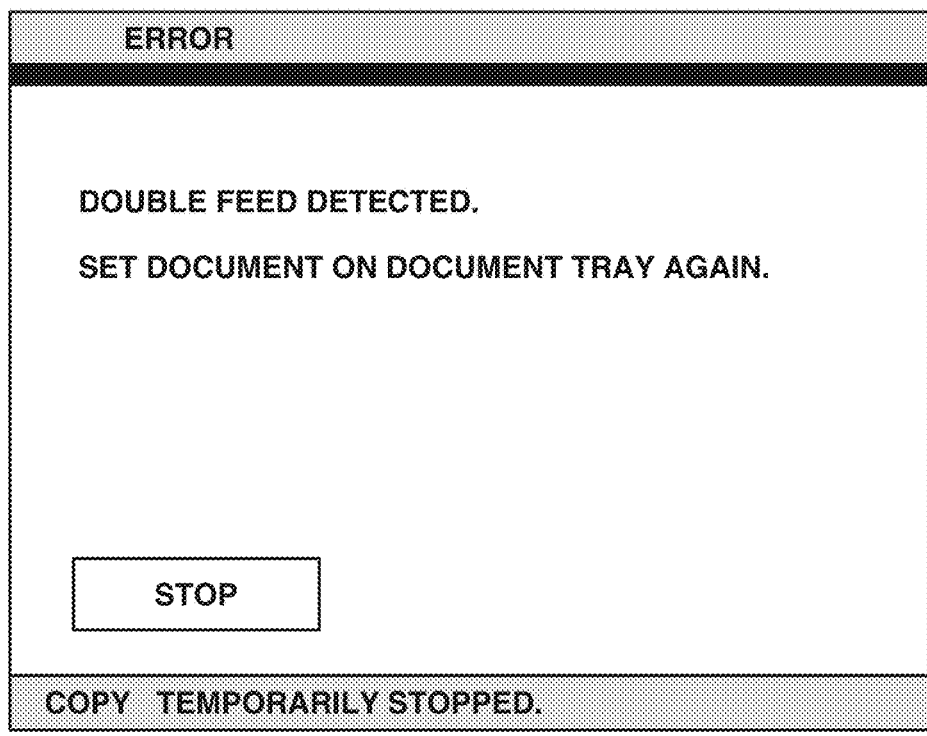

For example, if a jam of the document 32 occurs, an error screen 1410 illustrated in FIG. 14A is displayed on the display unit of the operation unit 150. Further, for example, if an error due to double feed detection of the document 32 occurs, an error screen 1420 illustrated in FIG. 14B is displayed on the display unit of the operation unit 150.

The printing apparatus according to the first exemplary embodiment reads image data of the target document from the storage device before image data for one page of the target document has been stored in the storage device and then performs printing based on the read image data.

This printing apparatus performs, upon occurrence of an interruption factor before image data for one page of the target document has been stored in the storage device, control to store specific data in the storage area of the storage device in which the remaining image data of the target document is to be stored. If an interruption factor occurs before image data for one page of the target document has been stored in the storage device, the printing apparatus performs printing based on the image data of the target document and specific data stored in the storage device.

This operation will be described in detail below.

Data to be stored in the image memory 120 will be described below with reference to the schematic diagrams illustrated in FIGS. 8A and 8B. As described above, the image memory 120 is shared by all of the image processing performed by the MFP 103. Therefore, an image memory area required for image processing based on a copy job is allocated in the image memory 120 each time when necessary. The image memory area allocated in the image memory 120 is released after use.

FIG. 8A schematically illustrates a state of data of the image memory 120 at the timing 701.

The example illustrated in FIG. 8A indicates a state in which indefinite data, as previously described in paragraph [0007], remains in the image memory 120.

If an interruption factor such as a jam occurs during conveyance of the document 32, the conveyance of the document 32 stops and therefore an image of the document 32 cannot be read by the scanner unit 130. Accordingly, the video signal of the scan image is not input to the controller unit 110. Unless the video signal of the scan image is input to the controller unit 110, image data generated by the scan processing is not stored in the image memory 120. Therefore, indefinite data remaining in the image memory 120 is not overwritten by the image data generated by the scan processing.

On the other hand, the data stored in the image memory 120 is read in the print processing. Then, the printing device 140 prints an image on a sheet based on the data read from the image memory 120 for printing.

In the first exemplary embodiment, an example in which the MFP 103 operates in the copy parallel processing mode, is described. The speed of storing image data in the image memory 120 by reading the document 32 is higher than the speed of reading image data from the image memory 120 for printing.

In the copy parallel processing mode, when the pull-in of the document 32 is started for the scan processing, the MFP 103 starts a preparation operation for performing the print processing. In the copy parallel processing mode, when the image of the document 32 is read by the scanner unit 130 and the video signal of the scan image is input to the controller unit 110, the data stored in the image memory 120 is read by the print processing. Therefore, if an interruption factor occurs during operation in the copy parallel processing mode and the controller unit 110 receives a request for stopping the operation for reading the document 32, the data stored in the image memory 120 has already been read by the print processing.

On the other hand, if an interruption factor such as a document jam occurs, the video signal of the scan image is not input to the controller unit 110 and therefore indefinite data remaining in the image memory 120 is not overwritten by the image data generated through the scan processing.

Therefore, if an interruption factor occurs during operation in the copy parallel processing mode, indefinite data remaining in the image memory 120 is read by the print processing. In this case, an image will be printed on a sheet based on the indefinite data read from the image memory 120. If this indefinite data is random data unexpected by the user, printing based on the random data will be performed. In such a case, the user will get confused at the unexpected data when the user sees a printed sheet (printed product). On the other hand, if this indefinite data is data of a different user's job that cannot be accessed by the user, printing based on the data of the different user's job will be performed. In such a case, when the user sees a printed sheet (printed product), the user will get to know the data of the different user's job that cannot essentially be accessed by the user. As will be explained later, one disclosed aspect of the embodiments prevents printing based on indefinite data. Therefore, the above undesirable results may be avoided.

For example, address "0x20000000" is assumed to be allocated as the starting address of the first image memory area 121, as illustrated in FIG. 8A. When the controller unit 110 is notified of the interrupt 707, image processing for scanning is started and processing for storing the processed image data in the image memory area 121 is started. The image data is divided into unit data with a fixed amount before being processed. The unit data may be one line, a band including a fixed number of lines, or a rectangle having a fixed size. The image data includes a fixed-length header portion and a variable-length data portion.

FIG. 8B schematically illustrates a state of image data stored in the image memory 120.

FIG. 8B illustrates a state where image data (low compression image data) for three pieces of unit data is stored in the image memory 120 when the controller unit 110 is notified of the interrupt 714. In this state, the CPU 111 starts reading image data from address "0x20000000" in the above-described processing in step S4003 illustrated in FIG. 3B. When reading of the header portion (A1) and the data portion (A1) of image data is completed, the image processing unit 118 of the controller unit 110 performs image processing on unit data (A1). Subsequently, when reading of the header portion (A2) and the data portion (A2) of image data is completed, the image processing unit 118 performs image processing on unit data (A2). Subsequently, when reading of the header portion (A3) and the data portion (A3) of image data is completed, the image processing unit 118 performs image processing on unit data (A3). Upon completion of reading of the header portion and the data portion of image data, the image processing unit 118 performs image processing on the corresponding unit data in this way.

When the controller unit 110 is notified of the interrupt 714, the MFP 103 is performing the scan processing and continuously performs image processing for scan. In the example illustrated in FIG. 8B, image data is continuously stored in the regions corresponding to addresses after the data portion (A3) of image data.

In the first exemplary embodiment, when the MFP 103 is operating in the copy parallel processing mode, the MFP 103 continues execution of the scan processing even if the controller unit 110 is notified of a failure by the failure notification 708.

In the first exemplary embodiment, even if, after the controller unit 110 is notified of the interrupt 707, a certain failure occurs during execution of the scan processing and a request for stopping the document read operation (hereinafter, referred to as an abort request) is generated, the MFP 103 continuously performs image processing for scanning up to the timing 718. This enables the MFP 103 to complete image data to be stored in the image memory 120.

Once a failure occurs, specific data is subsequently stored in the image memory 120. The specific data is, for example, data to be printed as a black solid image on a sheet (data composed of black pixels) or data to be printed as a blank on a sheet (data composed of white pixels).

Changing settings of various types of registers included in the video output circuit of the device I/F 134 of the controller 135 of the scanner unit 130 enables generating and outputting data (e.g., video signal) composed of black pixels and enables generating and outputting data (e.g., video signal) composed of white pixels. Then, the CPU 111 stores these pieces of output data (specific data) in the image memory 120. Even if, after the controller unit 110 is notified of the interrupt 707, a certain failure occurs during execution of the scan processing and an abort request is generated, indefinite data remaining in the image memory 120 is not read by the print processing. This is because indefinite data remaining in the image memory 120 is overwritten by specific data.

There may be a modification in which, even if an abort request is generated during execution of the scan processing, changing the address of the image memory 120 for reading image data enables preventing indefinite data remaining in the image memory 120 from being read in the print processing. For example, upon occurrence of an abort request during execution of the scan processing, it is only necessary to change the address of the image memory 120 for reading image data to the address for referring to an image memory area in which specific data is pre-stored. The specific data is, for example, data to be printed as a black solid image on a sheet (data composed of black pixels) or data to be printed as a blank on a sheet (data composed of white pixels). If a certain failure occurs during execution of the scan processing before the printing device 140 receives the command 710 (i.e., before starting the print processing), the MFP 103 performs abort processing upon reception of a failure notification. For example, when the controller unit 110 receives a failure notification before receiving the command 705, the MFP 103 performs the abort processing.

Figure 9A:
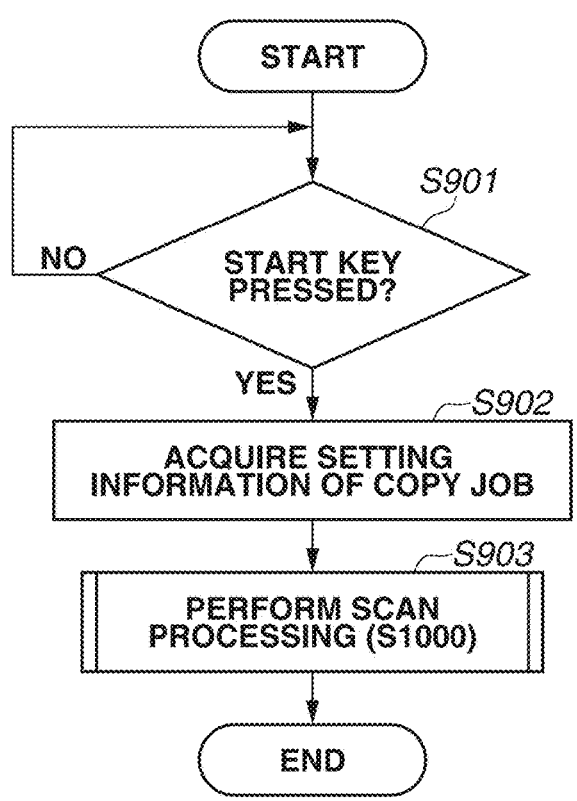
FIGS. 9A and 9B are flowcharts illustrating examples of control according to the first exemplary embodiment.
Figure 9B:
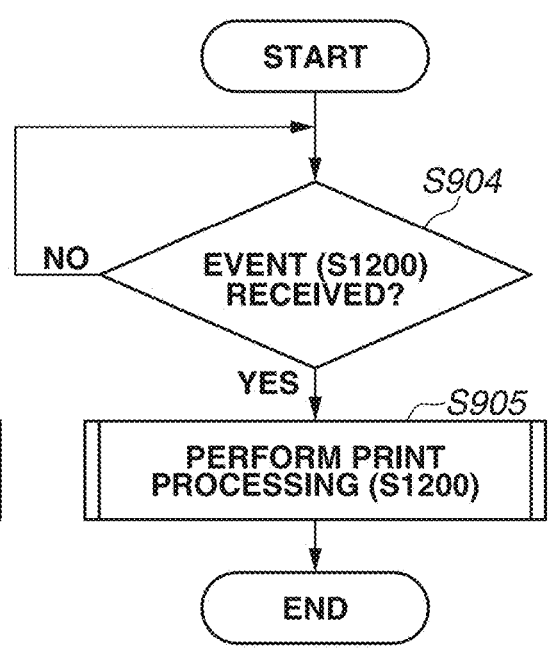

Next, with reference to the flowcharts illustrated in FIGS. 9A and 9B, a series of processing performed by the MFP 103 according to the first exemplary embodiment to execute a copy job for which an execution instruction is received, is described. This processing is implemented when the CPU 111 reads a control program from the ROM 113 or the HDD 114, loads it into the RAM 112, and executes it. The processing illustrated in FIG. 9A is started in a state where an execution screen for performing the copy processing is displayed on the display unit of the operation unit 150.

First, the flowchart illustrated in FIG. 9A will be described below.

In step S901, the CPU 111 determines whether the start key is pressed by the user via the operation unit 150. When the CPU 111 determines that the start key is pressed (YES in step S901), the processing proceeds to step S902. On the other hand, when the CPU 111 determines that the start key is not pressed (NO in step S901), the processing in step S901 is repeated until the start key is pressed.

In step S902, the CPU 111 acquires setting information of a copy job (e.g., settings of the number of copies, color selection, magnification, paper selection, page printing, page layout, bookbinding) from the HDD 114. It is assumed that the setting information of the copy job is pre-stored in the HDD 114 upon reception of the setting information of the copy job from the user via the operation unit 150 before the start key is pressed in step S901.

In step S903, the CPU 111 outputs a command for instructing the scanner unit 130 to start the scan processing (step S1000) described below with reference to FIG. 10. Upon reception of the instruction (hereinafter, referred to as a scan instruction) from the CPU 111, the scanner unit 130 performs the scan processing (step S1000).

Subsequently, the flowchart illustrated in FIG. 9B will be described below.

In step S904, the CPU 111 determines whether a print preparation start event (event 709) is received. When the CPU 111 determines that the print preparation start event (event 709) is received (YES in step S904), the CPU 111 outputs a command (command 710) for instructing the printing device 140 to start the print processing (step S1200) described below with reference to FIG. 12 (consisting of FIGS. 12A and 12B). Then, when the printing device 140 receives the instruction (hereinafter, referred to as a print instruction), in step S905, the controller unit 110 performs the print processing (step S1200). On the other hand, when the CPU 111 determines that the print preparation start event (event 709) is not received (NO in step S904), the processing in step S904 is repeated until the print preparation start event (event 709) is received.

When the setting information of the copy job acquired in step S902 has a specific value, the CPU 111 instructs the scanner unit 130 and the printing device 140 to start the copy processing by performing the scan processing (step S1000) and the print processing (step S1200) in parallel. More specifically, the CPU 111 instructs each of the scanner unit 130 and the printing device 140 to start the above-described copy processing phase (copy parallel processing mode) illustrated in FIG. 6A.

For example, when the setting information of a copy job includes "Direct" as the magnification, "1" as the number of copies, other than "Automatic Selection" for the color mode, and other than "Automatic Selection" for the paper feed stage, the CPU 111 instructs each of the scanner unit 130 and the printing device 140 to start the copy parallel processing mode. "Direct" selected as the magnification means a case where the user has specified "100%" as the magnification or a case where, for example, the user has specified "A4" as the output paper size for the "A4" document size. On the other hand, other than "Direct" ("Scaling") as the magnification means a case where, for example, the user has specified "86%" as the magnification or a case where the user has specified "A3" as the output paper size for the "B4" document size.

When "Automatic Selection" is selected for the color mode, the CPU 111 analyzes image data generated through document reading to determine whether the read document is color or monochrome. When the user specifies "Color" or "Monochrome" as a target document in advance, "Automatic Selection" is not selected for the color mode.

When "Automatic Selection" is selected for the paper feed stage, the CPU 111 searches for any one of the cassettes 351 to 354 storing sheets having the size coinciding with the output paper size and feeds a sheet from a cassette storing sheets having the size coinciding with the output paper size. The output paper size is determined, for example, based on the size of the reading target document and the magnification. On the other hand, other than "Automatic Selection" for the paper feed stage means a case where, for example, the user has specified in advance any one of the cassettes 351 to 354 or the manual feed tray 350 from which a sheet is fed.

Subsequently, with reference to the flowchart illustrated in FIG. 10, a series of processing (step S1000) performed by the MFP 103 according to the first exemplary embodiment to achieve the scan processing of a copy job for which an execution instruction is received, will be described. This processing is implemented when the CPU 111 reads a control program from the ROM 113 or the HDD 114, loads it into the RAM 112, and executes it.

Upon reception of the command 703, the controller unit 110 starts processing in step S1001. In step S1001, the CPU 111 sets the scan image path 3000 (illustrated in FIG. 3A) which specifies the order of image processing and the order of image areas for scanning.

In step S1002, the CPU 111 sets various parameters for performing the image processing in steps S3001 to S3003 (illustrated in FIG. 3A) to the image processing unit 118.

In step S1003, the CPU 111 calculates the capacity of a resource to be allocated to each of the first image memory area 121 and the second image memory area 122 based on the various parameters set in step S1002. The capacity of a resource to be allocated to each of the first image memory area 121 and the second image memory area 122 is determined by the data size of image data to be generated through document reading. The data size of image data to be generated through document reading depends on such settings as color, monochrome, reading resolution, and target document size.

In step S1004, the CPU 111 allocates a resource having the capacity calculated in step S1003 to each of the first image memory area 121 and the second image memory area 122.

After performing the processing in step S1004, then in step S1005, the CPU 111 outputs a command (command 706) for instructing the scanner unit 130 to read a document. In step S1005, upon reception of the read instruction from the CPU 111, the scanner unit 130 reads a document.

In step S1006, the CPU 111 determines whether the pull-in of the document 32 stacked on the document tray 30 is started. When the controller unit 110 receives the command 705, the CPU 111 determines that the pull-in of the document 32 is started (YES in step S1006), and the processing proceeds to step S1007. On the other hand, when the CPU 111 does not receive the command 705 (NO in step S1006), the processing in step S1006 is repeated until the command 705 is received.

In step S1007, the CPU 111 determines whether a failure notification is received. When the controller unit 110 receives the failure notification 708 from the controller 135 of the scanner unit 130, the CPU 111 determines that a failure notification is received (YES in step S1007), and the processing proceeds to step S1024. In step S1024, the CPU 111 performs the abort processing. This corresponds to a case where a certain failure occurs during execution of the scan processing before the printing device 140 receives the command 710 (i.e., before it starts the print processing). Therefore, the CPU 111 performs the abort processing upon reception of a failure notification.

On the other hand, when the CPU 111 does not receive the failure notification 708 from the controller 135 of the scanner unit 130 (NO in step S1007), the processing proceeds to step S1008. After performing the abort processing in step S1024, then in step S1025, the CPU 111 performs predetermined end processing to end a series of processing (step S1000) relating to the scan processing.

In step S1008, the CPU 111 waits for an interrupt signal (interrupt 707) indicating the start of video. This interrupt signal is a hardware interrupt signal input from the scanner unit 130 to the image processing unit 118 via the device I/F 116. By using this interrupt signal as a trigger, the video signal of the scan image is input from the scanner unit 130.

When the controller unit 110 is notified of the interrupt 707, the CPU 111 determines that an interrupt signal indicating the start of video is input (YES in step S1008), and the processing proceeds to step S1009. On the other hand, when the controller unit 110 is not notified of the interrupt 707 (NO in step S1008), the processing in step S1008 is repeated until the CPU 111 is notified of the interrupt 707.

In step S1009, the CPU 111 performs processing for converting the video signal into low compression image data via the image processing unit 118.

In step S1010, the CPU 111 stores the low compression image data generated by the processing in step S1009 in the first image memory area 121.

In step S1011, the CPU 111 determines whether a failure notification is received. When the controller unit 110 receives the failure notification 708 from the controller 135 of the scanner unit 130, the CPU 111 determines that a failure notification is received (YES in step S1011), and the processing proceeds to step S1012.

In step S1012, the CPU 111 determines whether the MFP 103 is operating in the copy processing phase (copy parallel processing mode) illustrated in FIG. 6A.

When the CPU 111 determines that the MFP 103 is not operating in the copy parallel processing mode (NO in step S1012), the processing proceeds to step S1024. In step S1024, the CPU 111 performs the abort processing. Since this case corresponds to a case where a certain failure occurs during execution of the scan processing while the MFP 103 is not operating in the copy parallel processing mode, the CPU 111 performs the abort processing upon reception of a failure notification. More specifically, if a certain failure occurs during execution of the scan processing while the MFP 103 is not operating in the copy parallel processing mode, the print processing has not yet been started. In this case, therefore, the print processing can be canceled before starting the print processing. Therefore, even after an abort request is generated, the print processing is not started. Therefore, indefinite data remaining in the image memory 120 is not read by the print processing, and printing based on indefinite data will not be performed. In step S1024, the CPU 111 performs the abort processing. In step S1025, the CPU 111 performs predetermined end processing to end a series of processing (step S1000) relating to the scan processing.

On the other hand, when the CPU 111 determines that the MFP 103 is operating in the copy parallel processing mode (YES in step S1012), the processing proceeds to step S1026. This case corresponds to a case where, while the MFP 103 is operating in the copy parallel processing mode, the CPU 111 is notified of the interrupt 707 and then a certain failure occurs during execution of the scan processing.

In step S1026, the CPU 111 stores specific data in the first image memory area 121. The specific data is, for example, data to be printed as a black solid image on a sheet (data composed of black pixels) or data to be printed as a blank on a sheet (data composed of white pixels). After performing the processing in step S1026, the processing proceeds to step S1013.

As described above, even if a certain failure occurs during execution of the scan processing and an abort request is generated, the MFP 103 continuously performs image processing for scanning up to the timing 718 to complete image data to be stored in the image memory 120. When a failure occurs, specific data is subsequently stored in the image memory 120. Even if an abort request is generated, the MFP 103 continuously performs image processing for scanning up to the timing 718 to complete image data to be stored in the image memory 120. This prevents indefinite data remaining in the image memory 120 from being read by the print processing, thus preventing printing based on indefinite data.

If this indefinite data is random data unexpected by the user, printing based on random data will be performed. In such a case, the user will get confused at the unexpected data when the user sees a printed sheet (printed product). In the first exemplary embodiment, since printing based on indefinite data is prevented, the user will not get confused at the unexpected data when the user sees a printed sheet (printed product).

On the other hand, if this indefinite data is the data of a different user's job that cannot be accessed by the user, printing based on the data of the different user's job will be performed. In such a case, when the user sees a printed sheet (printed product), the user will get to know the data of the different user's job that cannot essentially be accessed by the user. In the first exemplary embodiment, on the other hand, printing based on indefinite data is prevented. Therefore, when the user sees a printed sheet (printed product), the user will not get to know the data of the different user's job that cannot essentially be accessed by the user.

In step S1013, the CPU 111 waits for an interrupt signal indicating the end of video output from the image processing unit 118. This interrupt signal is a hardware interrupt signal internally generated by the image processing unit 118 based on the parameters set in step S1002.

When the CPU 111 determines that an interrupt signal indicating the end of video is input (YES in step S1013), the processing proceeds to step S1014. On the other hand, when the CPU 111 determines that an interrupt signal indicating the end of video is not input (NO in step S1013), the processing returns to step S1011. In step S1014, the CPU 111 performs processing for compressing the low compression image data stored in the first image memory area 121 by the compression/decompression unit 119.

In step S1015, the CPU 111 stores the encoded image data generated in step S1014, in the second image memory area 122.

In step S1016, the CPU 111 determines whether the compression processing performed in step S1014 is completed. When the CPU 111 determines that the compression processing is completed (YES in step S1016), the processing proceeds to step S1017. On the other hand, when the CPU 111 determines that the compression processing is not completed (NO in step S1016), the processing returns to step S1014.

In step S1017, the CPU 111 releases the resource of the first image memory area 121 allocated in step S1004. The resource of the first image memory area 121 is released upon reception of a command (a command for releasing a resource of the image memory 120) output by the CPU 111. In other words, the resource of the first image memory area 121 is not released until a command (a command for releasing a resource of the image memory 120) output by the CPU 111 is received. There may be a modification in which, when the CPU 111 outputs a command (a command for releasing a resource of the image memory 120), the resource of the first image memory area 121 is released.

After performing the processing in step S1017, then in step S1018, the CPU 111 performs processing for storing in the HDD 114 the encoded image data stored in the second image memory area 122.

In step S1019, the CPU 111 stores in the HDD 114 the encoded image data output from the second image memory area 122.

In step S1020, the CPU 111 determines whether the store processing performed in step S1018 is completed. When the CPU 111 determines that the store processing is completed (YES in step S1020), the processing proceeds to step S1021. On the other hand, when the CPU 111 determines that store processing is not completed (NO in step S1020), the processing returns to step S1018.

In step S1021, the CPU 111 releases the resource of the second image memory area 122 allocated in step S1004. The resource of the second image memory area 122 is released upon reception of a command (a command for releasing a resource of the image memory 120) output by the CPU 111. In other words, the resource of the second image memory area 122 is not released until a command (a command for releasing a resource of the image memory 120) output by the CPU 111 is received. There may be a modification in which, when the CPU 111 outputs a command (a command for releasing a resource of the image memory 120), the resource of the second image memory area 122 is released.

In step S1022, the CPU 111 releases the resources of the image processing unit 118 used for the above-described scan processing.

In step S1023, the CPU 111 determines whether the next page is present. The next page refers to the second and subsequent pages of the document. For example, when the page (e.g., a document) to be scanned by the scanner unit 130 remains, the CPU 111 determines that the next page is present (YES in step S1023), and the processing returns to step S1002. On the other hand, when the CPU 111 determines that the next page is not present (NO in step S1023), then in step S1025, the CPU 111 performs predetermined end processing to end a series of processing (step S1000) related to the scan processing.

Although the CPU 111 is described to release the resource of the first image memory area 121 in step S1017 upon completion of the compression processing performed in step S1014, the processing is not limited thereto.

Even if the compression processing performed in step S1014 is completed, the CPU 111 may not release the resource of the first image memory area 121. Instead, the CPU 111 may release the resource of the first image memory area 121 upon generation of image data by reading the next page of the document. More specifically, the CPU 111 does not need to release the resource of the first image memory area 121 allocated for the preceding page until an interrupt signal indicating the start of video of the next page is determined to have been input.

Although the CPU 111 is described to release the resource of the second image memory area 122 in step S1021 upon completion of the store processing performed in step S1018, the processing is not limited thereto.

Even if the compression processing performed in step S1018 is completed, the CPU 111 may not release the resource of the second image memory area 122. Instead, the CPU 111 may release the resource of the second image memory area 122 upon generation of image data by reading the next page of the document. More specifically, the CPU 111 does not need to release the resource of the second image memory area 122 allocated for the preceding page until an interrupt signal indicating the start of video of the next page is determined to have been input.

Alternatively, at a timing at which it is difficult to allocate a resource of the image memory 120 for the next page, the CPU 111 may release the resources of the image memory 120 (the first image memory area 121 and the second image memory area 122) allocated for the preceding page.

Figure 11:
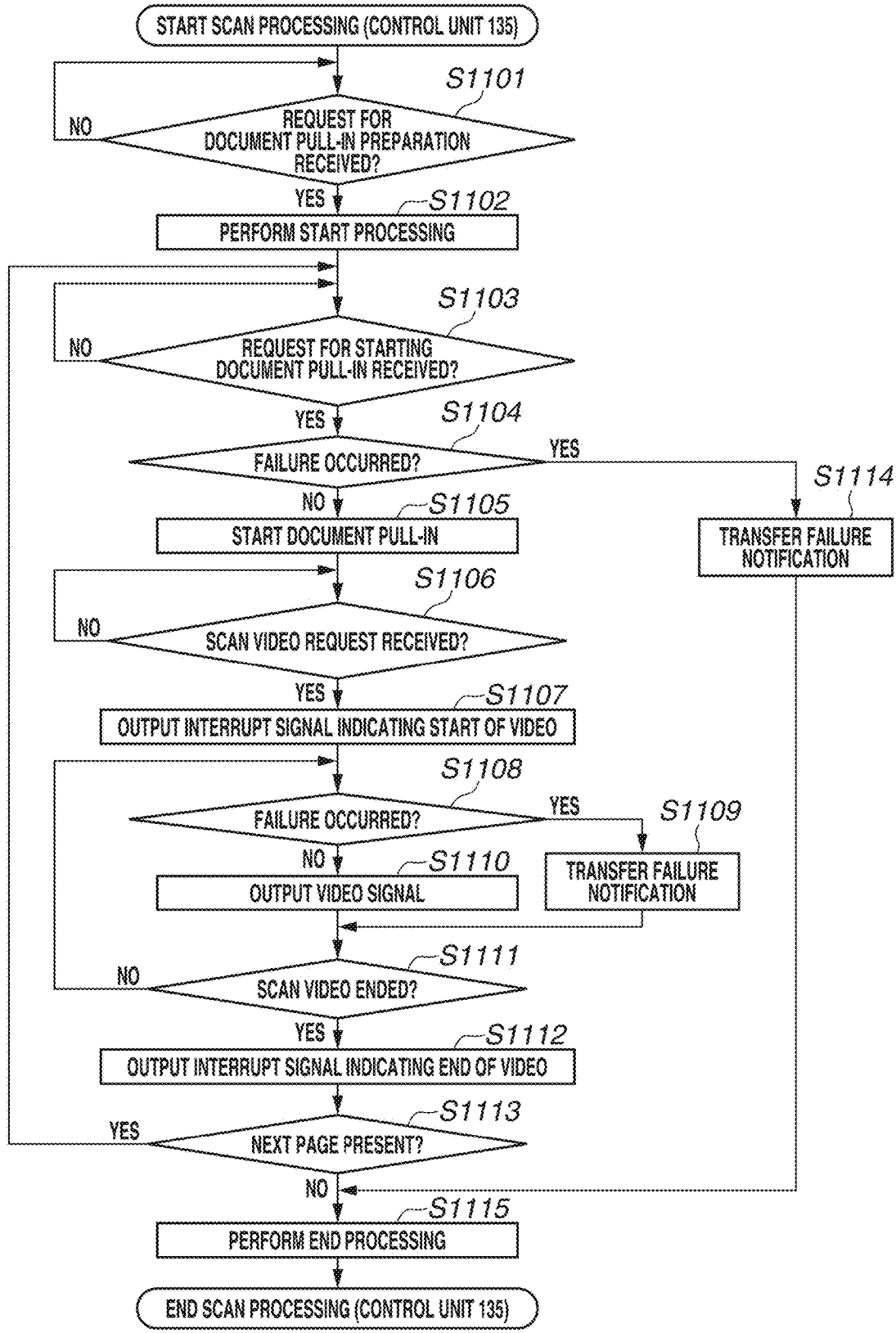
FIG. 11 is a flowchart illustrating an example of control according to the first exemplary embodiment.

With reference to the flowchart illustrated in FIG. 11, a series of processing performed by the controller 135 of the scanner unit 130 in the MFP 103 according to the first exemplary embodiment to achieve the scan processing of a copy job. This processing is implemented when the CPU 131 of the controller 135 reads a control program from the ROM 133 of the scanner unit 130, loads it into the RAM 132, and executes it.

In step S1101, the CPU 131 waits for a request for preparing to pull in the document 32 (command 702). Upon reception of the command 702, the CPU 131 determines that a request for preparing to pull in the document 32 is received (YES in step S1101), and the processing proceeds to step S1102. On the other hand, when the command 702 is not received (NO in step S1101), the CPU 131 repeats the processing in step S1101 until the command 702 is received.

In step S1102, the CPU 131 performs processing for activating the scanner unit 130.

In step S1103, the CPU 131 waits for a request for starting pulling in the document 32 (command 704). Upon reception of the command 704, the CPU 131 determines that the request for starting pulling in the document 32 is received (YES in step S1103), and the processing proceeds to step S1104. On the other hand, when the command 704 is not received (NO in step S1103), the CPU 131 repeats the processing in step S1103 until the command 704 is received.

In step S1104, the CPU 131 determines whether a certain failure occurred in the scanner unit 130 before pulling in the document 32. Failures occurring in the scanner unit 130 before pulling in the document 32 include, for example, a stop of document conveyance due to reception of user's pressing of the stop key for stopping pulling in the document 32 via the operation unit 150. Such failures further include a scan video signal error due to electrical noise.

When the CPU 131 determines that a failure occurred (YES in step S1104), the processing proceeds to step S1114. Then in step S1114, the CPU 131 notifies the CPU 111 of the controller unit 110 of the failure notification 708. Accordingly, the CPU 111 determines that a failure notification is received (YES in step S1007 in FIG. 10). In step S1114, the CPU 131 notifies the CPU 111 of the failure notification 708. In step S1115, the CPU 131 performs predetermined end processing, and the controller 135 of the scanner unit 130 ends a series of processing for performing the scan processing of a copy job.

On the other hand, when the CPU 131 determines that a failure has not occurred (NO in step S1104), the processing proceeds to step S1105. Then in step S1105, the CPU 131 starts pulling in the document 32 placed on the document tray 30. At this timing, the CPU 131 of the scanner unit 130 outputs the command 705, and the CPU 111 of the controller unit 110 receives the command 705. Accordingly, the CPU 111 determines that the pull-in of the document 32 is started (YES in step S1006 in FIG. 10).

In step S1106, the CPU 131 determines whether a scan video request is received from the controller unit 110. Upon reception of the command 706, the CPU 131 determines that a request for inputting the video signal of the scan image (scan video request) is received from the scanner unit 130 (YES in step S1106), and the processing proceeds to step S1107. On the other hand, when the command 706 is not received (NO in step S1106), the CPU 131 repeats the processing in step S1106 until the command 706 is received.

In step S1107, the CPU 131 outputs an interrupt signal (interrupt 707) indicating the start of video to the controller unit 110. Accordingly, the CPU 111 determines that an interrupt signal indicating the start of video is input (YES in step S1008 in FIG. 10).

In step S1104, the CPU 131 determines whether a certain failure occurred in the scanner unit 130 during execution of the scan processing. Errors which possibly occur during execution of the scan processing include, for example, a jam of the document 32, an error due to incorrect size detection of the document 32, an error due to double feed detection, an error due to stopped scan processing, and a scan video signal error due to electrical noise.

When the CPU 131 determines that a failure has occurred (YES in step S1108), the processing proceeds to step S1109. Then in step S1109, the CPU 131 notifies the CPU 111 of the controller unit 110 of the failure notification 708.

Figure 10:
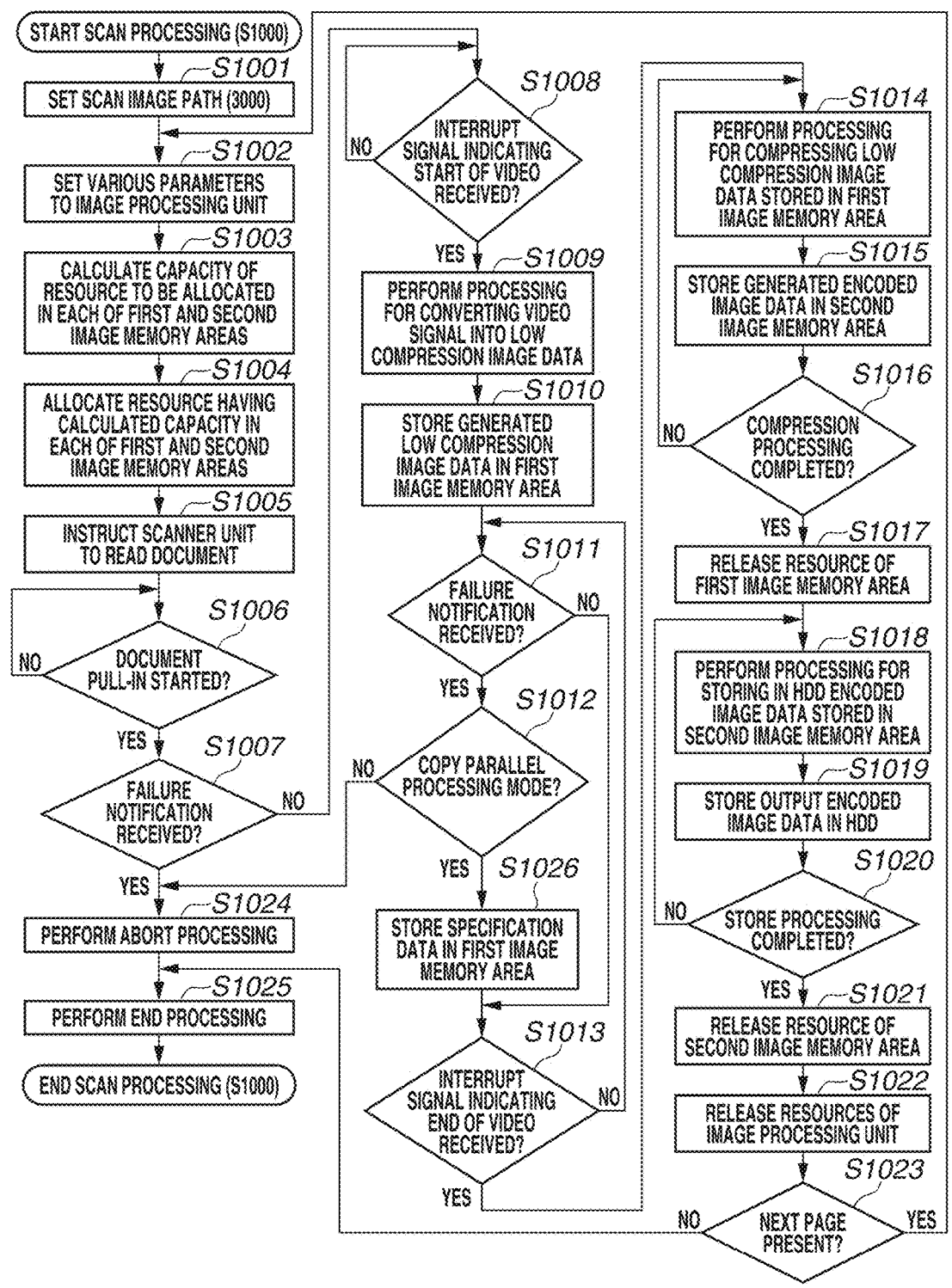
FIG. 10 is a flowchart illustrating an example of control according to the first exemplary embodiment.

Accordingly, the CPU 111 determines that a failure notification is received (YES in step S1011 in FIG. 10). As described above with reference to step S1007 in FIG. 10, when the CPU 111 receives the failure notification 708 from the controller 135 of the scanner unit 130, the CPU 111 determines that it is notified of a failure. As described above with reference to step S1024 in FIG. 10, the CPU 111 performs the abort processing upon reception of the failure notification 708.

In step S1109, the CPU 131 notifies the CPU 111 of the failure notification 708. Then, the processing proceeds to step S1111.

On the other hand, when the CPU 131 determines that a failure has not occurred (NO in step S1108), the processing proceeds to step S1110. In step S1110, based on the read image of the document 32, the CPU 131 outputs to the controller 110 a video signal generated by the video output circuit included in the device I/F 134 of the controller 135 of the scanner unit 130. After performing the processing in step S1110, the processing proceeds to step S1111.

In step S1111, the CPU 131 determines whether the video signal of the scan image ends. When the CPU 131 determines that the video signal of the scan image ends (YES in step S1111), the processing proceeds to step S1112. On the other hand, when the CPU 131 determines that the video signal of the scan image does not end (NO in step S1111), the processing returns to step S1108.

In step S1112, the CPU 131 outputs an interrupt signal indicating the end of the video signal of the scan image to the controller unit 110. In step S1113, the CPU 131 determines whether the next page is present. The next page refers to the second and subsequent pages of the document 32. For example, when the document 32 placed in the document tray 30 remains, the CPU 131 determines that the next page is present (YES in step S1113), and the processing returns to step S1103. On the other hand, when the document 32 placed in the document tray 30 does not remain, the CPU 131 determines that the next page is not present (NO in step S1113) and, the processing proceeds to step S1115. In step S1115, the CPU 131 performs predetermined end processing. After performing the processing in step S1115, the controller 135 of the scanner unit 130 ends a series of processing for performing the scan processing of a copy job.

There will be described, with reference to the flowchart illustrated in FIG. 12, a series of processing (step S1200) performed by the MFP 103 according to the first exemplary embodiment to achieve the print processing of a copy job for which an execution instruction is received. This processing is implemented when the CPU 111 reads a control program from the ROM 113 or the HDD 114, loads it into the RAM 112, and executes it.

Upon reception of the command 710, the printing device 140 performs processing in steps S1201 to S1204.

In step S1201, the CPU 111 sets the print image path 4000 which specifies the order of image processing and the order of image areas for printing, as illustrated in FIG. 3B.

In step S1202, the CPU 111 sets various parameters for performing the image processing in steps S4001 to S4003 (illustrated in FIG. 3B) to the image processing unit 118.

In step S1203, the CPU 111 calculates the capacity of a resource to be allocated in each of the third image memory area 123 and the fourth image memory area 124 based on the various parameters set in step S1202. The capacity of a resource to be allocated in each of the third image memory area 123 and the fourth image memory area 124 is determined by the data size of image data to be generated through document reading. The data size of image data to be generated through document reading depends on such settings as color, monochrome, reading resolution, and target document size.

In step S1204, the CPU 111 allocates a resource having the capacity calculated in step S1203 in each of the third image memory area 123 and the fourth image memory area 124.

Memory control in the print processing will be described below with reference to the schematic diagrams illustrated in FIGS. 13A, 13B, and 13C.

FIG. 13A illustrates a state where, after resources of the first image memory area 121 and the second image memory area 122 are allocated in the image memory 120, a resource of each of the third image memory area 123 and the fourth image memory area 124 is further allocated.

The third image memory area 123 is an area, for example, specified by address "0x80000000". When the size of the encoded image data to be stored in the image memory 120 is 25 MB, an area for 25 MB is allocated from an area corresponding to address "0x80000000".

The fourth image memory area 124 is an area, for example, specified by address "0x90000000". When the size of the low compression image data to be stored in the image memory 120 is 133 MB, an area for 133 MB is allocated from an area corresponding to address "0x90000000".

The sizes of the areas allocated in the image memory 120 are as follows. The first image memory area 121 and the fourth image memory area 124 provide the same size, and the second image memory area 122 and the third image memory area 123 provide the same size.

The flowchart illustrated in FIG. 12 will be described again below.

After performing the processing in step S1204, then in step S1205, the CPU 111 outputs a command (command 713) for instructing the printing device 140 to perform printing. In step S1206, the CPU 111 determines whether a video output start signal (interrupt 714) is received. This video output start signal is a hardware interrupt signal input from the printing device 140 to the image processing unit 118 via the device I/F 116. When the controller unit 110 is notified of the interrupt 714, the CPU 111 determines that a print video start interrupt (video output start signal) is received (YES in step S1206), and the processing proceeds to step S1207. On the other hand, when the controller unit 110 is not notified of the interrupt 714 (NO in step S1206), the processing in step S1206 is repeated until the controller unit 110 is notified of the interrupt 714.

In step S1207, the CPU 111 determines whether the resource of the first image memory area 121 is released. When the CPU 111 determines that the resource of the first image memory area 121 is released (YES in step S1207), the processing proceeds to step S1213. On the other hand, when the CPU 111 determines that the resource of the first image memory area 121 is not released (NO in step S1207), the processing proceeds to step S1208.

When the low compression image data for the same page of the document is stored in the first image memory area 121, the CPU 111 determines that the resource of the first image memory area 121 is not released (NO in step S1207). On the other hand, when the low compression image data for the same page of the document is not stored in the first image memory area 121, the CPU 111 determines that the resource of the first image memory area 121 is released (YES in step S1207).

Alternatively, when a command for releasing a resource of the image memory 120 is output, the CPU 111 may determine that the resource of the first image memory area 121 is released (YES in step S1207). On the other hand, when the command for releasing a resource of the image memory 120 is not output, the CPU 111 may determine that the resource of the first image memory area 121 is not released (NO in step S1207).

Processing in step S1208 and subsequent steps will be described below.

In step S1208, the CPU 111 changes the address of the image memory 120 for reading the low compression image data from the address (d) for referring to the fourth image memory area 124 to the address (a) for referring to the first image memory area 121.

The schematic diagrams illustrated in FIGS. 13A, 13B, and 13C will be described again below.

FIG. 13B illustrates a state where the address of the image memory 120 for reading the low compression image data is changed from address "0x90000000" to address "0x20000000" by the processing in step S1208. Thus, as preprocessing for outputting the video signal to the printing device 140, the CPU 111 is able to read the low compression image data stored in the area specified by address "0x20000000" (i.e., the first image memory area 121).

The flowchart illustrated in FIG. 12 will be described again below.

After performing the processing in step S1208, then in step S1209, the CPU 111 releases the resources of the third image memory area 123 and the fourth image memory area 124 allocated in step S1204. When a command (a command for releasing a resource of the image memory 120) output by the CPU 111 is received, the resources of the third image memory area 123 and the fourth image memory area 124 are released. In other words, the resources of the third image memory area 123 and the fourth image memory area 124 are not released until a command (a command for releasing a resource of the image memory 120) output by the CPU 111 is received. There may be a modification in which, when the CPU 111 outputs a command (a command for releasing a resource of the image memory 120), the resources of the third image memory area 123 and the fourth image memory area 124 are released.

The schematic diagrams illustrated in FIGS. 13A, 13B, and 13C will be described again below.

FIG. 13C illustrates a state where the resources of the first image memory area 121 and the second image memory area 122 are allocated in the image memory 120 and where the resources of the third image memory area 123 and the fourth image memory area 124 are released from the image memory 120. In this state, for example, a resource of the image memory 120 for the scan processing on another page can be allocated to the third image memory area 123 specified by address "0x80000000". Further, for example, a resource of the image memory 120 for the scan processing on another page can be allocated to the fourth image memory area 124 specified by address "0x90000000".

The flowchart illustrated in FIG. 12 will be described again below.

After performing the processing in step S1209, then in step S1210, the CPU 111 performs processing for converting the low compression image data stored in the first image memory area 121 into a video signal via the image processing unit 118.

In step S1211, the CPU 111 outputs the video signal generated by the processing in step S1209 to the printing device 140.

In step S1212, the CPU 111 determines whether the conversion processing performed in step S1209 is completed. When the CPU 111 determines that the conversion processing is completed (YES in step S1212), the processing proceeds to step S1230. On the other hand, when the CPU 111 determines that the conversion processing is not completed (NO in step S1212), the processing returns to step S1210.

Processing in step S1213 and subsequent steps will be described below.

In step S1213, the CPU 111 determines whether the resource of the second image memory area 122 is released. When the CPU 111 determines that the resource of the second image memory area 122 is released (YES in step S1213), the processing proceeds to step S1219. On the other hand, when the CPU 111 determines that the resource of the second image memory area 122 is not released (NO in step S1213), the processing proceeds to step S1214.

When the encoded image data for the same page of the document is stored in the second image memory area 122, the CPU 111 determines that the resource of the second image memory area 122 is not released (NO in step S1213). On the other hand, when the encoded image data for the same page of the document is not stored in the second image memory area 122, the CPU 111 determines that the resource of the second image memory area 122 is released (YES in step S1213).

Alternatively, when a command for releasing a resource of the image memory 120 is output, the CPU 111 may determine that the resource of the second image memory area 122 is released (YES in step S1213). On the other hand, when a command for releasing a resource of the image memory 120 is not output, the CPU 111 may determine that the resource of the second image memory area 122 is not released (NO in step S1213).

In step S1214, the CPU 111 changes the address of the image memory 120 for reading the encoded image data from the address (c) for referring to the third image memory area 123 to the address (b) for referring to the second image memory area 122.

In step S1215, the CPU 111 releases the resource of the third image memory area 123 allocated in step S1204. When a command (a command for releasing a resource of the image memory 120) output by the CPU 111 is received, the resource of the third image memory area 123 is released. In other words, the resource of the third image memory area 123 is not released until a command (a command for releasing a resource of the image memory 120) output by the CPU 111 is received. There may be a modification in which, when the CPU 111 outputs a command (a command for releasing a resource of the image memory 120), the resource of the third image memory area 123 is released.

In step S1216, the CPU 111 performs processing for decompressing the encoded image data stored in the second image memory area 122 via the compression/decompression unit 119.

In step S1217, the CPU 111 stores the low compression image data generated by the processing in step S1216 in the fourth image memory area 124.

In step S1218, the CPU 111 determines whether the decompression processing performed in step S1215 is completed. When the CPU 111 determines that the decompression processing is completed (YES in step S1218), the processing proceeds to step S1226. On the other hand, when the CPU 111 determines that decompression processing is not completed (NO in step S1218), the processing returns to step S1216.

Processing in step S1219 and the subsequent steps will be described below.

In step S1219, the CPU 111 performs processing for reading the encoded image data from the HDD 114.

In step S1220, the CPU 111 stores the encoded image data read in step S1219 in the third image memory area 123.

In step S1221, the CPU 111 determines whether the read processing performed in step S1219 is completed. When the CPU 111 determines that the read processing is completed (YES in step S1221), the processing proceeds to step S1222. On the other hand, when the CPU 111 determines that read processing is not completed (NO in step S1221), the processing returns to step S1219.

In step S1222, the CPU 111 performs processing for decompressing the encoded image data stored in the third image memory area 123 via the compression/decompression unit 119.

In step S1223, the CPU 111 stores the low compression image data generated in step S1221 in the fourth image memory area 124.

In step S1224, the CPU 111 determines whether the decompression processing performed in step S1222 is completed. When the CPU 111 determines that the decompression processing is completed (YES in step S1224), the processing proceeds to step S1225. On the other hand, when the CPU 111 determines that decompression processing is not completed (NO in step S1224), the processing returns to step S1222.

In step S1225, the CPU 111 releases the resource of the third image memory area 123 allocated in step S1204. When a command (a command for releasing a resource of the image memory 120) output by the CPU 111 is received, the resource of the third image memory area 123 is released. In other words, the resource of the third image memory area 123 is not released until a command (e.g., a command for releasing a resource of the image memory 120) output by the CPU 111 is received. There may be a modification in which, when the CPU 111 outputs a command (e.g., a command for releasing a resource of the image memory 120), the resource of the third image memory area 123 is released.

Processing in step S1226 and the subsequent steps will be described below.

In step S1226, the CPU 111 performs processing for converting the low compression image data stored in the fourth image memory area 124 into a video signal via the image processing unit 118.

In step S1227, the CPU 111 outputs the video signal generated in step S1226 to the printing device 140.

In step S1228, the CPU 111 determines whether the conversion processing performed in step S1226 is completed. When the CPU 111 determines that the conversion processing is completed (YES in step S1228), the processing proceeds to step S1229. Then in step S1229, the CPU 111 releases the resource of the fourth image memory area 124 allocated in step S1204. When a command (a command for releasing a resource of the image memory 120) output by the CPU 111 is received, the resource of the fourth image memory area 124 is released. In other words, the resource of the fourth image memory area 124 is not released until a command (a command for releasing a resource of the image memory 120) output by the CPU 111 is received. There may be a modification in which, when the CPU 111 outputs a command (a command for releasing a resource of the image memory 120), the resource of the fourth image memory area 124 is released.

Processing in step S1230 and the subsequent steps will be described below.

In step S1230, the printing device 140 prints an image on a sheet based on the video signal (i.e., image data) output by the processing in step S1211 or S1227.

In step S1231, the CPU 111 waits for a video output end signal output from the image processing unit 118. This video output end signal is a hardware interrupt signal internally generated by the image processing unit 118 based on the parameters set in step S1202. When the CPU 111 determines that the video output end signal is input (YES in step S1231), the processing proceeds to step S1232. On the other hand, when the CPU 111 determines that the video output end signal is not input (NO in step S1231), the processing in step S1231 is repeated until the video output end signal is input.

In step S1232, the CPU 111 releases the resources of the image processing unit 118 used for the above-described print processing.

In step S1233, the CPU 111 determines whether the next page is present. For example, when there remains a page to be printed by the printing device 140, the CPU 111 determines that the next page is present (YES in step S1233), and the processing returns to step S1202. On the other hand, when the CPU 111 determines that the next page is not present (NO in step S1233), the CPU 111 ends a series of processing (step S1200) relating to the print processing.

The printing apparatus according to the first exemplary embodiment reads image data of a target document from the storage device before image data for one page of the target document has been stored in the storage device and then performs printing based on the read image data. This printing apparatus performs, upon occurrence of an interruption factor before image data for one page of the target document has been stored in the storage device, control to store specific data in the storage area of the storage device in which the remaining image data of the target document is to be stored. If an interruption factor occurs before image data for one page of the target document has been stored in the storage device, the printing apparatus performs printing based on the image data of the target document and specific data stored in the storage device.

More specifically, even if, after the controller unit 110 is notified of the interrupt 707, a certain failure occurs during execution of the scan processing and an abort request is generated, the printing apparatus continuously performs image processing for scanning up to the timing 718. More specifically, upon occurrence of a failure, the CPU 111 subsequently stores specific data in the image memory 120 to complete target image data to be stored in the image memory 120. More specifically, indefinite data remaining in the image memory 120 is overwritten by the specific data. Therefore, even if, after the controller unit 110 is notified of the interrupt 707, a certain failure occurs during execution of the scan processing and an abort request is generated, it is possible to prevent the indefinite data remaining in the image memory 120 from being read in the print processing, thus preventing printing based on the indefinite data.

If this indefinite data is random data unexpected by the user, printing based on the random data will be performed. In such a case, the user will get confused at the unexpected data when the user sees a printed sheet (printed product). On the other hand, according to the first exemplary embodiment, since printing based on the indefinite data is prevented, the user will not get confused at the unexpected data when the user sees a printed sheet (printed product).

On the other hand, if this indefinite data is data of a different user's job that cannot be accessed by the user, printing based on the data of the different user's job will be performed. In such a case, when the user sees a printed sheet (printed product), the user will get to know the data of the different user's job that cannot essentially be accessed by the user. In the first exemplary embodiment, on the other hand, printing based on the indefinite data can be prevented. Therefore, when the user sees a printed sheet (or a printed product), the user will not get to know the data of the different user's job that cannot essentially be accessed by the user.

Other Embodiments

The disclosure is not limited the above-described exemplary embodiments, and can be modified in diverse ways (including organic combinations of these exemplary embodiments) without departing from the spirit and scope thereof. These modifications are not excluded from the scope of the disclosure.

For example, although, in the present exemplary embodiment, the above-described various control is performed by the CPU 111 of the controller unit 110 of the MFP 103, the configuration is not limited thereto. A part or whole of the above-described various controls may be configured to be executable by a print control unit such as an external controller, which is a separate unit of the MFP 103.

The disclosure can also be achieved when a program for implementing at least one of the above-described functions is supplied to a system or apparatus via a network or storage medium, and at least one processor in a computer of the system or apparatus reads and executes the program. Further, the disclosure can also be achieved by a circuit for implementing at least one function (for example, an application specific integrated circuit (ASIC)).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A copying apparatus comprising:
   a reader configured to read a document;
   a storage configured to store image data of the document read by the reader;
   a printer; and
   a controller configured to read the image data of the document from the storage before image data for one page of the document has been stored in the storage and cause the printer to perform printing based on the read image data,
   wherein the controller performs, in a case where an interruption factor of reading by the reader occurs before image data for one page of the document has been stored in the storage, control to transfer specific data to the printer instead of remaining image data of the document which is to be transferred to the printer, and
   wherein, in a case where the interruption factor of reading by the reader occurs before image data for one page of the document has been stored in the storage, the printer performs printing based on the image data of the document stored in the storage and the specific data transferred by the controller.

2. The copying apparatus according to claim 1,
   wherein, in a case where the copying apparatus is in a mode and the interruption factor occurs before image data for one page of the document has been stored in the storage, the controller performs control to transfer the specific data to the printer instead of remaining image data of the document which is to be transferred to the printer, and
   wherein, in a case where the copying apparatus is not in the mode and the interruption factor occurs before image data for one page of the document has been stored in the storage, the controller does not perform control to transfer the specific data to the printer instead of remaining image data of the document which is to be transferred to the printer.

3. The copying apparatus according to claim 1, further comprising a generator configured to, in a case where the interruption factor occurs before image data for one page of the document has been stored in the storage, generate specific data,
   wherein the controller performs, in a case where an interruption factor occurs before image data for one page of the document has been stored in the storage, control to transfer the specific data generated by the generator to the printer instead of remaining image data of the document which is to be transferred to the printer.

4. The copying apparatus according to claim 1, wherein a speed for storing the image data of the document read by the reader in the storage is higher than a speed for reading the image data of the document from the storage by the controller.

5. The copying apparatus according to claim 1, wherein, while the image data of the document is being read from the storage by the controller, image data of a new document read by the reader is stored in the storage.

6. The copying apparatus according to claim 1,
   wherein, since the image data of the document cannot be stored in the storage before image data for one page of the document has been stored in the storage, the controller performs control to transfer the specific data to the printer instead of remaining image data of the document which is to be transferred to the printer.

7. The copying apparatus according to claim 1, further comprising a conveyer configured to convey the document,
   wherein the interruption factor is a jam of a document conveyed by the conveyer.

8. The copying apparatus according to claim 1, further comprising a conveyer configured to convey the document,
   wherein the interruption factor is a double feed of the document conveyed by the conveyer.

9. The copying apparatus according to claim 1, further comprising a key configured to receive from a user an instruction for stopping reading the document by the reader,
   wherein the interruption factor is a stop of reading of the document based on the instruction received by the key.

10. The copying apparatus according to claim 1, wherein the specific data is data including white pixels.

11. A method for controlling a copying apparatus which comprises a reader configured to read a document, and a printer, the method comprising:
    reading, by the reader, a document;
    storing image data of the read document in a storage;
    reading the image data of the document from the storage before image data for one page of the document has been stored in the storage and causing the printer to perform printing based on the read image data; and
    performing, in a case where an interruption factor of reading by the reader occurs before image data for one page of the document has been stored in the storage, control to transfer specific data to the printer instead of remaining image data of the document which is to be transferred to the printer,
    wherein, in a case where the interruption factor of reading by the reader occurs before image data for one page of the document has been stored in the storage, the printer performs printing based on the image data of the document stored in the storage and the transferred specific data.

12. A non-transitory computer-readable storage medium storing a program for causing a computer to execute a method for controlling a copying apparatus which comprises a reader configured to read a document, the method comprising:
    reading, by the reader, a document;
    storing image data of the read document in a storage;
    reading the image data of the document from the storage before image data for one page of the document has been stored in the storage and causing a printer to perform printing based on the read image data; and
    performing, in a case where an interruption factor of reading by the reader occurs before image data for one page of the document has been stored in the storage, control to transfer specific data to the printer instead of remaining image data of the document which is to be transferred to the printer,
    wherein, in a case where the interruption factor of reading by the reader occurs before image data for one page of the document has been stored in the storage, the printer performs printing based on the image data of the document stored in the storage and the transferred specific data.

* * * * *